US010980338B1

(12) United States Patent
Marion

(10) Patent No.: US 10,980,338 B1
(45) Date of Patent: Apr. 20, 2021

(54) TABLE WITH MULTIPLE HORIZONTALLY AND VERTICALLY ADJUSTABLE TABLE TOP SECTIONS

(71) Applicant: Neil V. Marion, Rigby, ID (US)

(72) Inventor: Neil V. Marion, Rigby, ID (US)

( * ) Notice: Subject to any disclaimer, the term of this patent is extended or adjusted under 35 U.S.C. 154(b) by 0 days.

(21) Appl. No.: 16/658,080

(22) Filed: Oct. 19, 2019

(51) Int. Cl.
| | | |
|---|---|---|
| *A47B 13/08* | (2006.01) | |
| *A47B 13/02* | (2006.01) | |
| *A47B 9/10* | (2006.01) | |
| *A47B 13/10* | (2006.01) | |
| *F16C 1/10* | (2006.01) | |

(52) U.S. Cl.
CPC .............. *A47B 13/081* (2013.01); *A47B 9/10* (2013.01); *A47B 13/023* (2013.01); *A47B 13/088* (2013.01); *A47B 13/10* (2013.01); *A47B 2013/025* (2013.01); *F16C 1/10* (2013.01)

(58) Field of Classification Search
CPC .. A47B 1/056; A47B 1/00; A47B 1/02; A47B 1/05; A47B 13/081; A47B 13/088; A47B 13/10; A47B 2013/025
USPC ......... 108/66, 65, 102, 70, 71, 76, 141, 138, 108/105, 73, 84
See application file for complete search history.

(56) References Cited

U.S. PATENT DOCUMENTS

| | | | | |
|---|---|---|---|---|
| 351,101 | A | * 10/1886 | Fauber | .................. A47B 1/056 108/66 |
| 732,227 | A | * 6/1903 | Shafer et al. | .......... A47B 1/056 108/66 |
| 1,547,685 | A | * 7/1925 | Rhodes | ................ A47B 13/088 108/66 |
| 1,653,657 | A | * 12/1927 | Pretsch | ................ A47B 23/046 108/141 |
| 1,897,884 | A | * 2/1933 | Biery | ................... A47B 23/046 108/8 |
| 3,124,084 | A | 3/1964 | Fuller et al. | |
| 3,696,760 | A | 10/1972 | Riley | |

(Continued)

FOREIGN PATENT DOCUMENTS

DE 866992 C * 2/1953 ............. A47B 1/056

OTHER PUBLICATIONS

Internet Printout, Homestead Dining Table with Slide-out Laptop Trays, https://www.walmart.com/ip/Homestead-Dining-Table-with-Slide-out-Laptop-Trays-Espresso/22150786, Jan. 28, 2019.

(Continued)

*Primary Examiner* — Jose V Chen
(74) *Attorney, Agent, or Firm* — Pedersen & Company, PLLC; Ken J. Pedersen; Barbara S. Pedersen

(57) ABSTRACT

Multiple table top sections are separately and independently adjustable both vertically and horizontally, so that multiple patients/users can sit and use the table comfortably and with a feeling of inclusion and community. The controllers for unlatching each table section may be biased paddles under, but very near, the right and/or left edges of the table sections. By placing the user's palm on the top of table section and curling the fingers down around the edge to engage the paddle, the user can grasp both the right or left edge and the associated paddle with the same hand, to both unlatch the table top section and apply force to the edge to move the table section into the desired adjusted position. Release of the paddle and the edge automatically relatch the table section in the desired adjusted position for use of the table.

21 Claims, 21 Drawing Sheets

(56) References Cited

U.S. PATENT DOCUMENTS

| | | | |
|---|---|---|---|
| 4,248,477 A | 2/1981 | Netters | |
| 4,706,572 A * | 11/1987 | Priesemuth | B25H 1/00 |
| | | | 108/60 |
| 4,782,764 A * | 11/1988 | Robinson | A47B 7/00 |
| | | | 108/104 |
| 4,836,114 A | 6/1989 | Cohen et al. | |
| 4,917,436 A | 4/1990 | Thom | |
| 5,156,095 A * | 10/1992 | Hansbaek | A47B 1/03 |
| | | | 108/66 |
| 5,237,937 A * | 8/1993 | Peltier | A47B 13/088 |
| | | | 108/66 |
| 5,363,772 A | 11/1994 | Adamidis | |
| 5,410,971 A | 5/1995 | Golden et al. | |
| 5,458,070 A * | 10/1995 | Gamba | A47B 1/00 |
| | | | 108/65 |
| 5,503,086 A | 4/1996 | Hoffman et al. | |
| 6,009,814 A * | 1/2000 | Rossi | A47B 1/05 |
| | | | 108/66 |
| 6,786,161 B2 | 9/2004 | Fischer | |
| 9,883,737 B2 * | 2/2018 | Lanphear | A47B 13/023 |
| 2006/0075940 A1 * | 4/2006 | Dodge | A47B 1/03 |
| | | | 108/86 |
| 2009/0050032 A1 * | 2/2009 | Conley | A47B 1/056 |
| | | | 108/66 |
| 2012/0085270 A1 * | 4/2012 | Schroer | A61D 3/00 |
| | | | 108/140 |
| 2015/0047538 A1 * | 2/2015 | Ergun | A47B 9/10 |
| | | | 108/147 |
| 2015/0330559 A1 * | 11/2015 | Li | F16M 11/28 |
| | | | 108/147 |

OTHER PUBLICATIONS

Internet Printout of gas spring information, DICTATOR Technik GmbH, at least as early as Oct. 1, 2019.

* cited by examiner

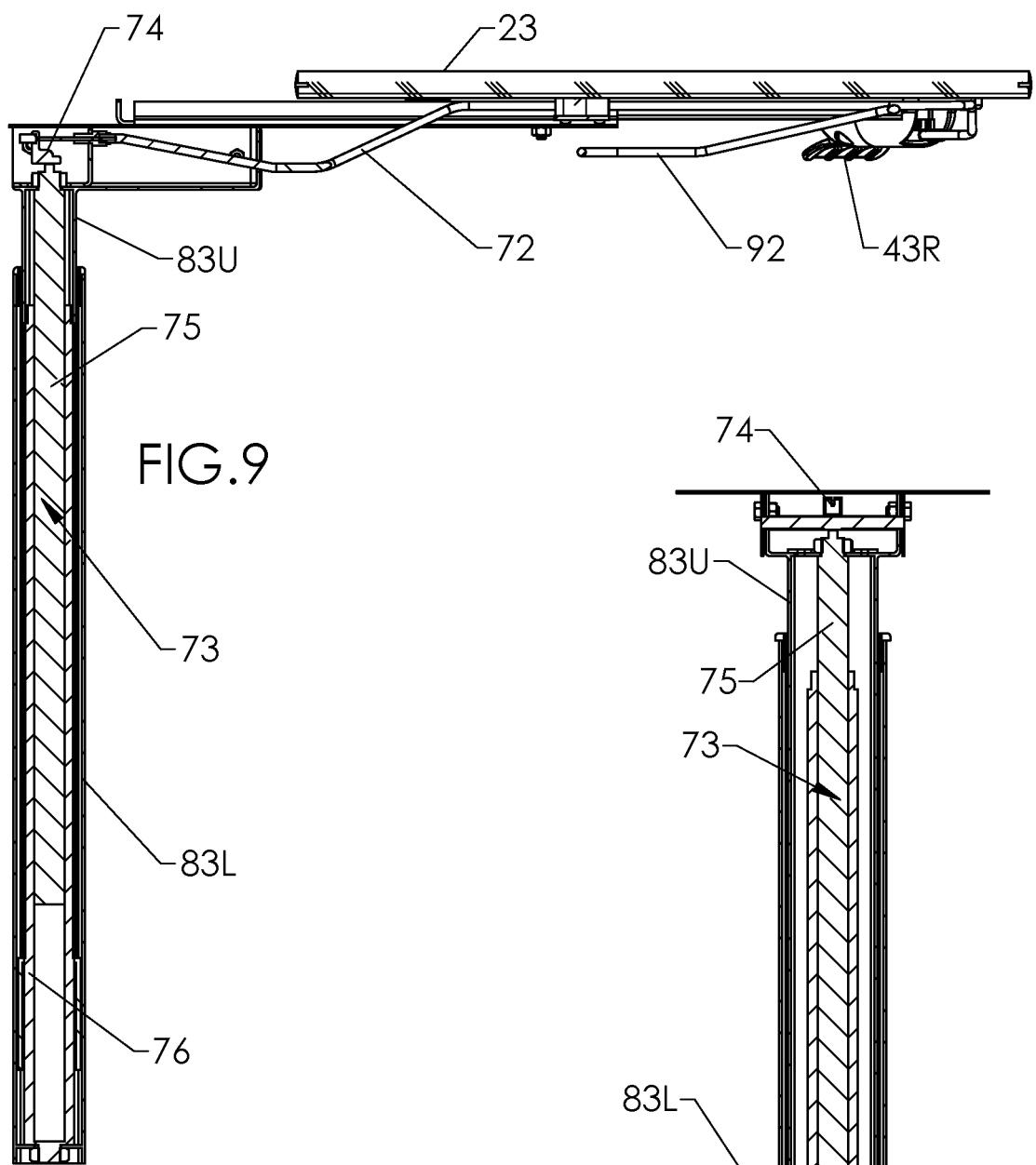

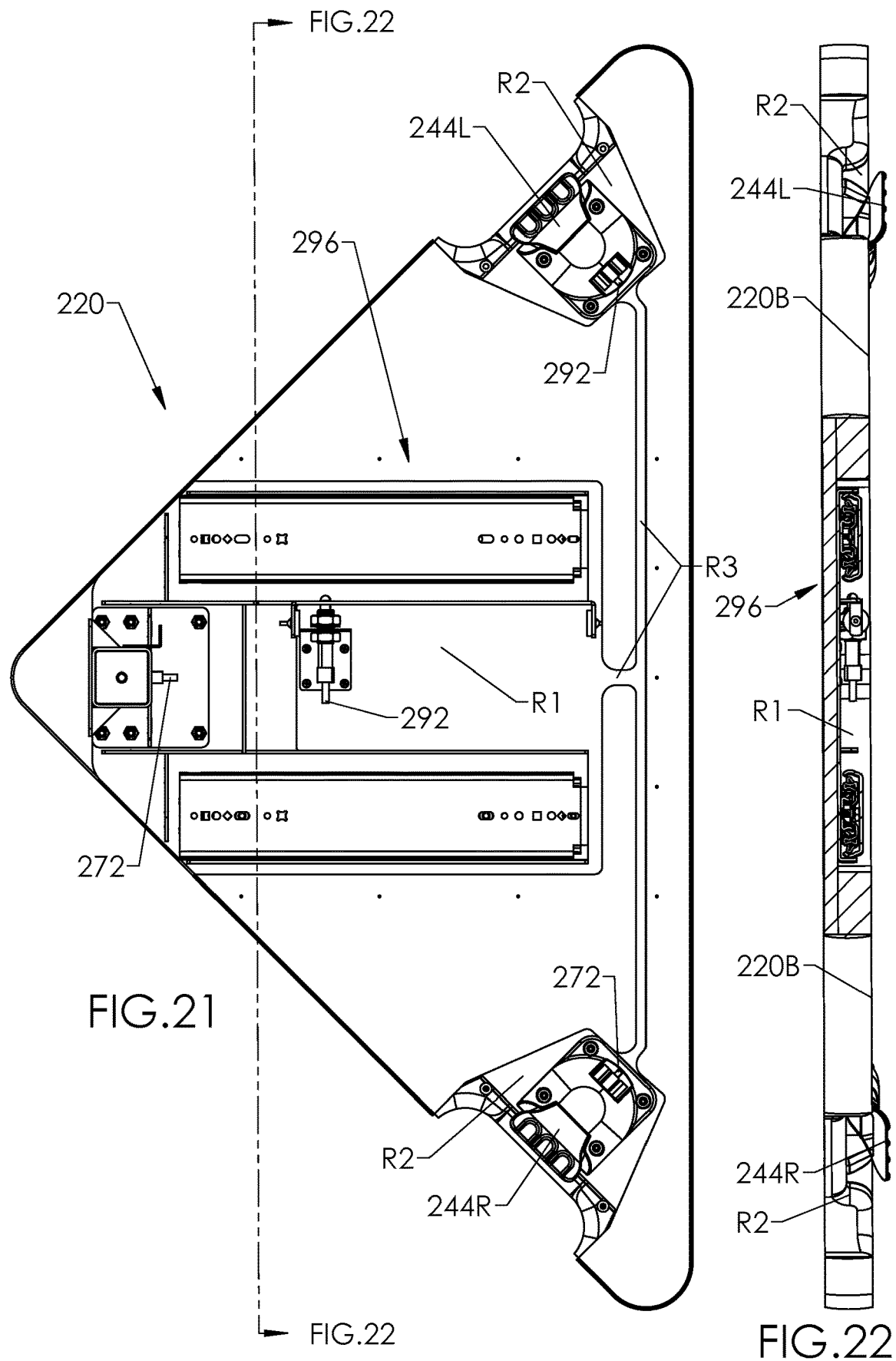

TABLE WITH MULTIPLE HORIZONTALLY AND VERTICALLY ADJUSTABLE TABLE TOP SECTIONS

BACKGROUND OF THE INVENTION

Field of the Invention

This invention relates to a table that is adjustable, especially for use by people who are patients or residents in a health-care or other care facility, and/or people who are elderly, physically-challenged, and/or need individual accommodation in sitting position or location when using a table. More particularly, the table has multiple sections that are each adjustable vertically and horizontally, so that people may sit at the same table but with the table sections custom-adjusted for each person. Therefore, the table may be used to encourage socializing and a feeling of inclusion in a meal and/or other activity around the table.

SUMMARY OF THE INVENTION

The present invention comprises a table, and/or components thereof, wherein multiple table top sections are adjustable vertically and horizontally, so that multiple people may use their respective table top section at a level and location convenient and comfortable for their respective needs. In certain embodiments, one or more of the table top sections are separately and independently adjustable both vertically and horizontally relative to the other table top sections. In certain embodiments of one or more of the table top sections, the vertical adjustment and the horizontal adjustment are independent and separate. For example, the table top section(s) may be vertically adjusted no matter in what horizontal positon the table top section is located at the time, and the table top section(s) may be horizontally adjusted no matter in what vertical position the table top section is located at the time. Preferably, one or more, or preferably each, of the table top sections may be adjusted to many vertical positions upward and downward relative to a leg/stand, for example a center base, of the table, and the table top section also may be adjusted to many horizontal positions inward and outward relative to the leg/support of the table. Preferably, the timing and amount of vertical adjustment is not controlled or limited by the horizontal position of the top section at the time of vertical adjustment, and, likewise, the timing and amount of horizontal adjustment is not controlled or limited by the vertical position of the top section at the time of horizontal adjustment.

Preferably, the adjustment mechanisms of each table top section, and the control actuators of each adjustment mechanism, are separate and independent from the adjustment mechanisms and manual control actuators of all the other top sections. Preferably, the adjustment mechanisms and the manual control actuator for the vertical adjustment of a given table top section is separate and independent from the adjustment mechanisms and the manual control actuator for the horizontal adjustment of that given table top section. Thus, preferably, two separate and independent control actuators are provided on each table top section, so that one controls the vertical adjustment, and the other controls the horizontal adjustment. Further, preferably, the two separate and independent control actuators are manually operated, so that a person sitting standing or sitting at a given table top section can manually operate the actuator to adjust said table top section vertical position and the horizontal position, either sequentially in any order or optionally by operating control actuators at the same time. Said person standing or sitting at the given table top section may be a staff member of a healthcare or other care facility, family member, or even the person about to use the table top section if that person is physically capable of grasping one or both of the manual actuator(s) and also applying some force to the table top section to move the table top section in the desired direction(s) of adjustment.

In certain embodiments, the control actuators for a given top section are connected to their respective top section in positions that are generally easy to reach by a person standing or sitting at the front edge of the respective top section. In certain embodiments, the control actuator for the vertical adjustment and the horizontal adjustment for each respective top section are at/near the right and left edges of that table top section, so that a user may grasp the control in the same or similar motion as he/she would use to grasp the table top section right and left edges. For example, a vertical-adjustment control handle/paddle may be located at/near the right edge of the table top section, and a horizontal-adjustment control handle/paddle may be located at/near the left edge of the table top section. In certain embodiments, there is space between each table top section, at least where the control handle/paddle are located, and preferably along the entire right and left edge of each table top section. This way, there is horizontal space between the top sections, even if adjacent top sections are at the same level, so that a user may safely and comfortably grasp and operate the control handle/paddles in his/her hands, and adjust the table top section, without scraping or pinching his/her fingers, knuckles or any part of the hands.

In certain embodiments, a right and a left control handle/paddle are provided on the underside of their respective table top section, at or very near the right and left edges of the top section, respectively. Preferably, each of these control handle/paddles are placed and adapted so that the user may place his/her hand palm on the table top section top surface at the table top section edge, and curl his/her fingers around and below the edge to reach and operate the control handle/paddle to unlatch the top section from its original position. Further, this hand and finger placement relative to the table top section edge and the control handle/paddle allows the user to grasp the table top section edge while operating the control handle/paddle. Said grasping allows the user to apply the preferably-moderate or light-force on the table, to lift-up or push-down the table top section while operating the vertical-adjustment control handle/paddle, and/or to pull-out or push-in the table top section while operating the horizontal-adjustment control handle/paddle. Preferably, the adjustment mechanisms of each table top section, and the control actuators of each adjustment mechanism, are adapted so that, after operating the control handle(s)/paddle(s), and moving the table top section to the desired adjusted position by said grasping, the user may let-go-of/release the control handle(s)/paddle(s), and said release will cause the adjustment mechanism to relatch the table top section in said desired adjusted position. The user, or a person that then sits down at the table top section, may proceed to enjoy use of the table top section, for example, including socializing or at least being in the company of a "community" of people likewise using the various, adjacent table top sections.

BRIEF DESCRIPTION OF THE DRAWINGS

FIG. 9 is a cross-sectional view taken along the line 9-9 in FIG. 8, showing in cross-section an exemplary latching/locking gas spring, inside the telescoping tubes of the center base portion, used in the vertical-adjustment mechanism for the table top section.

FIG. 10 is a cross-sectional view taken along the line 10-10 in FIG. 8.

FIG. 21 is a bottom view of the table top section of FIGS. 19 and 20.

FIG. 22 is a cross-sectional view of the table top section of FIG. 21, viewed along the line 22-22 in FIG. 21.

DESCRIPTION OF THE PREFERRED EMBODIMENTS

Figure 1:
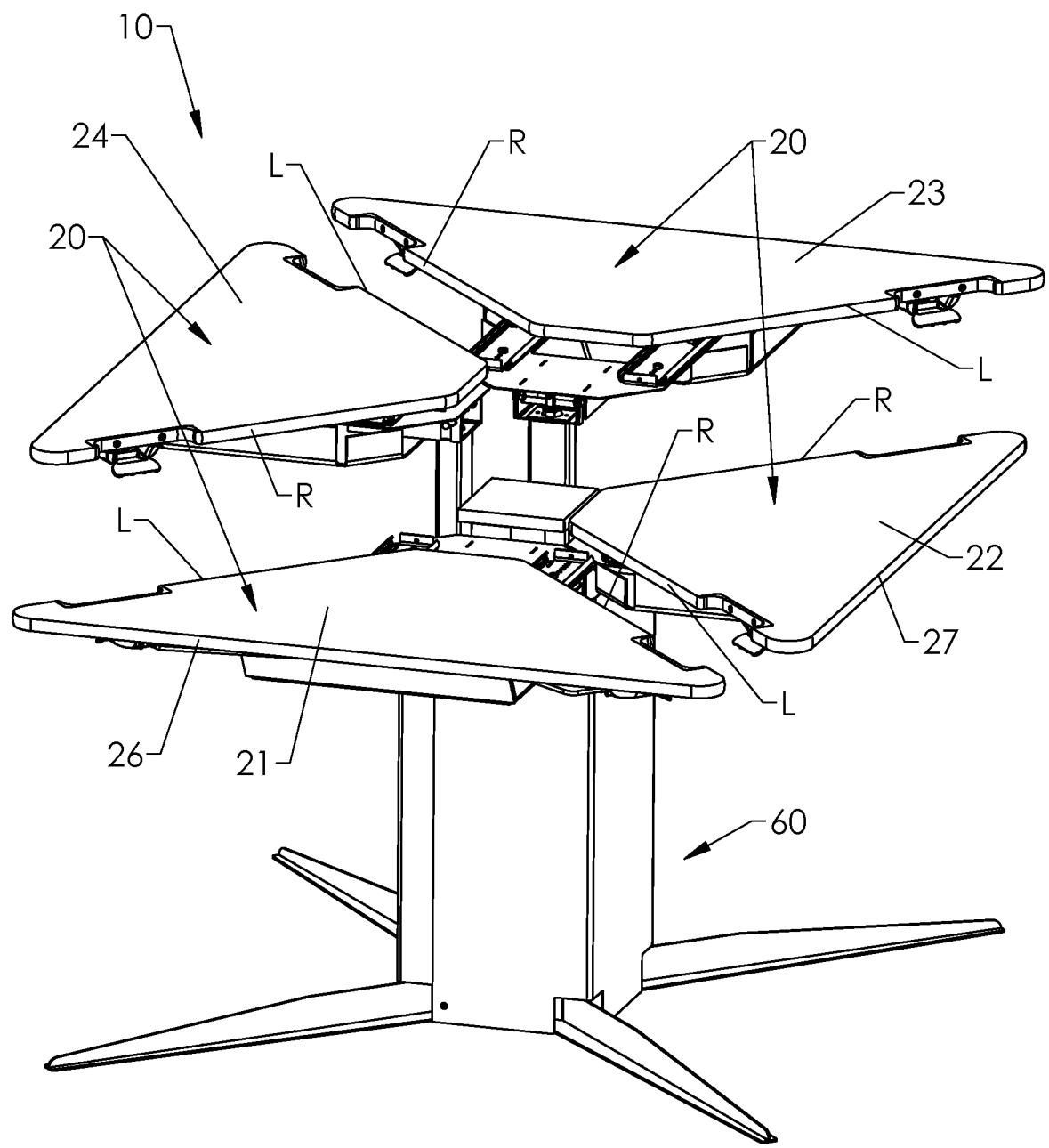
FIG. 1 is a top-front perspective view of one embodiment of the invented table, with table top sections adjusted vertically and horizontally into an exemplary configuration.

Referring to the Figures, there are shown several, but not the only, embodiments of the Table with Multiple Horizontally and Vertically Adjustable Table Top Sections, and/or components thereof. It should be noted that, for convenience of description, the right and left of a given table top section is defined as the direction corresponding to the right and left hands/sides, respectively, of a person sitting or standing at the outer edge of the given table top section. It should be noted that, for convenience of description, the terms "raising" and "lowering" of a given table top section is described from the perspective that the table is normally set on a floor or ground with the table top sections at, near, or above a top end of a table leg/stand such as a center base.

FIGS. 1-4 illustrate a table 10 with four table top sections 20 adjusted an exemplary one of many possible configurations wherein one or more sections are vertically and/or horizontally adjusted relative to each other and/or relative to the center base 60. While the table top sections 20 of this table embodiment 10 are each shaped and built to be the same, the table top sections are given, in some of the Figures, additional, different numbers (21, 22, 23 and 24) for convenience of explanation. In this exemplary configuration, front section 21 and right section 22 are lowered the same amount, to their full extent, relative to the center base 60 and the floor/ground, so that the top surfaces of sections 21 and 22 are at the same height/level above the floor/ground G. Front section 21 is pulled out (extended) horizontally, toward the viewer of FIG. 1, to be horizontally distanced from the center base 60, and the right section 22 is fully pushed in (retracted) horizontally, to be close to the center base 60. Thus, sections 21, 22 and their outer edges 26, 27 are at different distances from the center base 60 (see FIG. 5).

In the exemplary configuration of FIGS. 1-4, rear section 23 and left section 24 of the table 10 are raised vertically, the same amount, relative to the center base 60 so that the top surfaces of sections 23 and 24 are at the same height/level above sections 21 and 22 and the floor/ground G. Rear section 23 is pulled out (extended) horizontally to be distanced from the center base 60, and the left section 24 is fully pushed in (retracted) horizontally to be close to the center base 60.

Table 10 may be used in the adjustment configuration of FIGS. 1-4, for example, for two people to sit side-by-side at sections 21 and 22 because they need a lower meal, reading, or card playing surface from their positions in their wheel chairs. And, the two higher sections 23 and may be used, for example, for taller or larger-stature people, or people sitting in higher chairs, to sit side-by-side at sections, slightly above, but still part of the same social group as the people at sections 21 and 22. It may be noted that, in the case of table 10, the preferred adjustability and the preferred arrangement of the multiple table top sections radially spaced around a vertical centerline of the table provide a sense of inclusiveness, camaraderie and community for the users of the table. Each user sitting or standing at a section of the table 100, 200 is the same distance, or a similar distance even when the table sections are adjusted horizontally, from the center/vertical-centerline of the table, and so each user has a good social opportunity and experience at the table.

FIGS. 1-4 illustrate there are spaces between the right and left edges R, L of each table top section 20 relative to the adjacent sections 20. These spaces are affected by the amount that each section is extended, and, if adjacent sections are at different levels, the spaces between right and left edges R, L will be vertically-spaced as well as horizontally-spaced. One may compare the spaces between right and left edges R, L in FIGS. 1-4, which are relatively large due to the vertical and horizontal adjustment of the sections 20, to the relatively small spaces 30 between the right and left edges in FIG. 5 due to all the sections 20 being placed at the same height/level and being fully retracted toward the center base 60.

Many adjustment configurations, other than that shown in FIGS. 1-4, are possible and useful for table 10. Each of the sections 20 is preferably adjustable both vertically and horizontally, separately and independently of the others. For example, each of the sections 20 may be at a different height/level and may extend out horizontally a different amount. Further, both vertical and horizontal adjustments are preferably each continuous or substantially continuous for each of the sections 20, within a predetermined range for vertical adjustment and a predetermined range for horizontal adjustment, so that the sections 20 may be adjusted into a great number of different adjustment configurations. Each of the sections 20, and likewise sections 120 and 220 of tables 100 and 220 discussed later in this document, may be very effectively adjusted to suit many individuals and uses, by methods and means that comprise, consist essentially of, or consist of the vertical and horizontal adjustment structures and steps as described herein. Preferably, the table-top sections each have an upper surface that remains horizontal when in use and when the table top section is raised and lowered and when retracted and extended, via said vertical and horizontal adjustment; preferably no table-top section pivots or swings up or down from horizontal and, also, preferably no table-top section pivots or swings left to right, or right to left.

Figure 5:
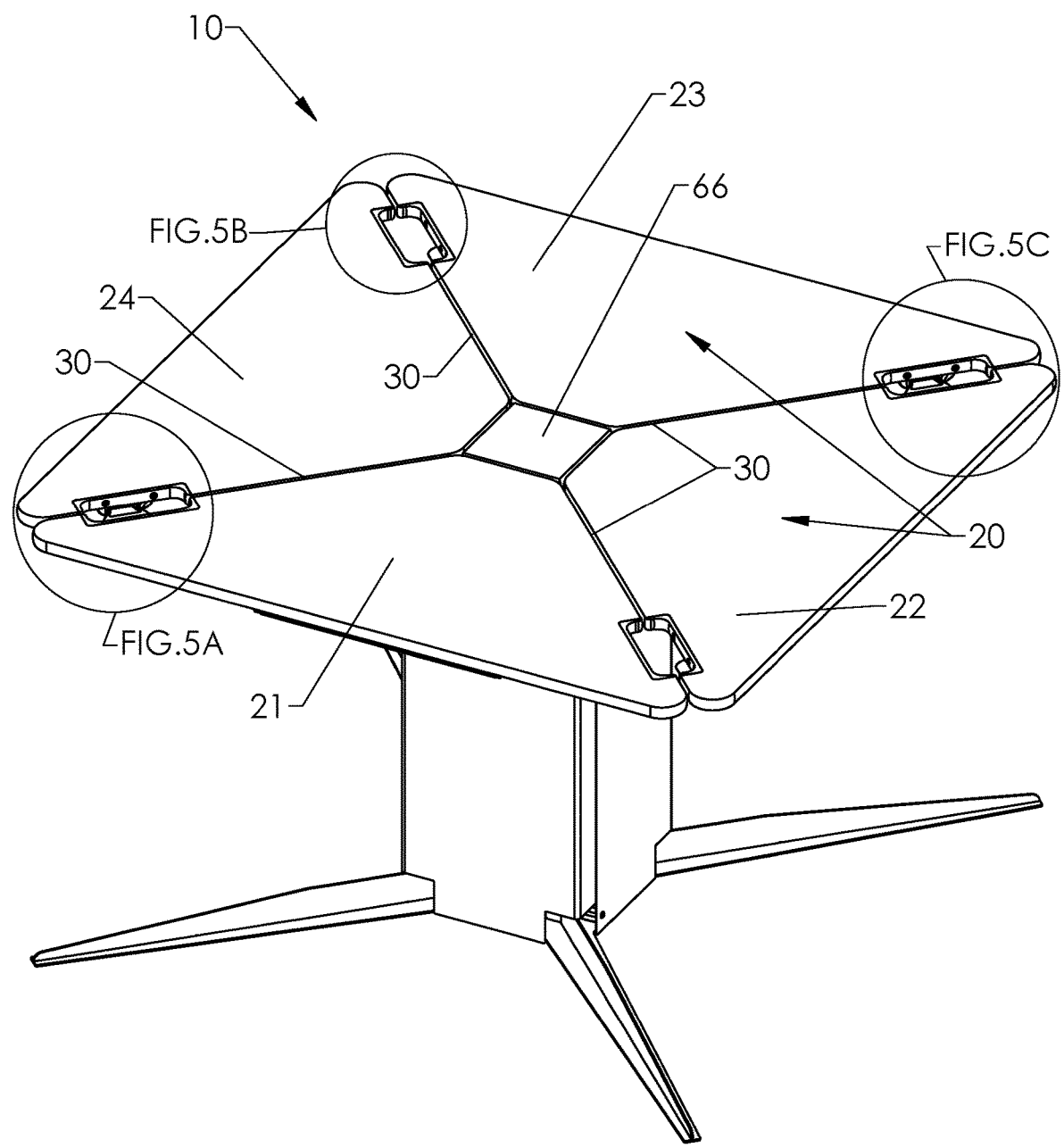
FIG. 5 is top perspective view of the table of FIG. 1, with the table top sections all positioned at the same vertical level and all pushed inward to a full extent.

FIG. 5 (and details 5A, B and C) illustrate the table 10 with all four table top sections 20 adjusted to be at the same height/level and fully-retracted toward the center base 60. For example, this may be a configuration for storage, for use by people who are the same or similar in stature and/or sitting in the same or similar chairs, and/or for guests visiting a medical or care facility who do not need adjustment in the table top sections. This view illustrates the elongated space 30 between all the sections 20 (21, 22, 23, 24), even when at the same height/level, which prevents the right and left edges of the sections from abutting into each other when they are at the same level, or when they pass by each other during vertical adjustment. The elongated spaces 30 thus help prevent any person's finger/hand, other body part, or clothing, for example, from being pinched between two sections 20 during adjustment of the sections.

Figure 5A:
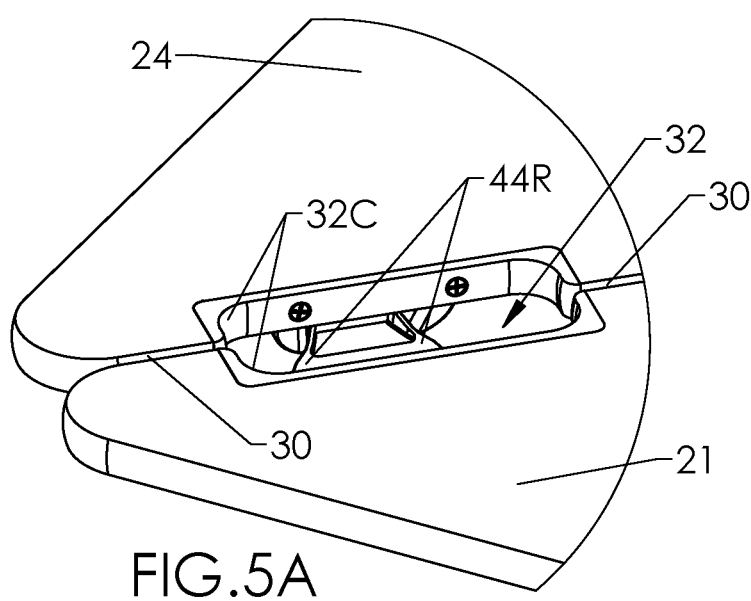
FIG. 5A is an enlarged detail view of the area circled and labeled "FIG. 5A" in FIG. 5, which shows an embodiment of an actuator mechanism control handle/paddle.

FIGS. 5A, B and C are enlarged detail views that shows the enlarged spaces 32 between adjacent top table sections that provides extra space, that is, a "notch" (hereafter a "hand-hold notch") in the table top section edge, for users' hands to reside and operate adjustment handles/paddles to unlatch the vertical and/or horizontal adjustment mechanisms, and to apply force to move the unlatch sections 20 to the desired locations/configurations. This space 32 is preferably wider that space 30, and is preferably wide enough to receive four fingers and their knuckles of at least one hand. Optionally, as two users may wish to adjust two adjacent table top sections as the same time, the space 32 may be wide enough to receive four fingers and their associated knuckles of two hands.

Figure 5B:
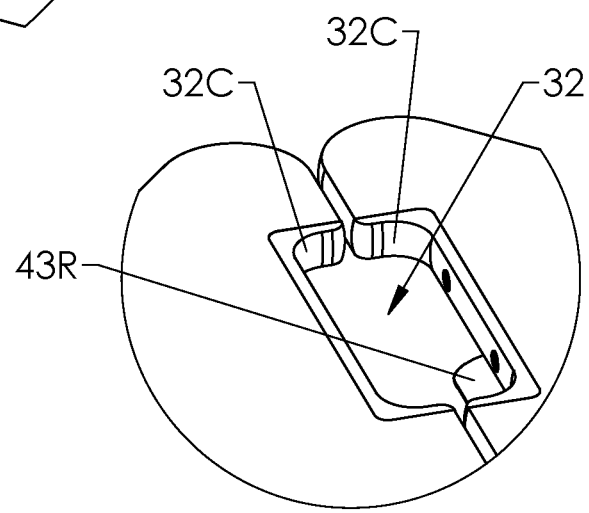
FIG. 5B is an enlarged detail view of the area circled and labeled "FIG. 5B" in FIG. 5, which shows a small portion of the control handle/paddle of an embodiment of an actuator mechanism.

Each space 32 may be considered the sum of two "hand-hold notches", one in each of the adjacent edges of the adjacent table top sections. Thus, the space 32 provides access to two of the control handles/paddles (hereafter "paddles"), that is, one for each of the adjacent table top sections. For example in FIG. 5A, one control paddle (not visible in FIGS. 5 and 5A) is at/near the left edge of section 21 for adjustment of section 21, and one control paddle 44R (visible in FIGS. 5 and 5A) is at/near the right edge of section 24 for adjustment of section 24. In FIG. 5B, space 32 provides access to one control paddle 43R (visible in FIGS. 5 and 5B) at/near the right edge of section 23 for adjustment of section 23, and one control paddle (not visible in FIGS. 5 and 5B) at/near the left edge of section 24 for control of section 24.

Figure 5C:
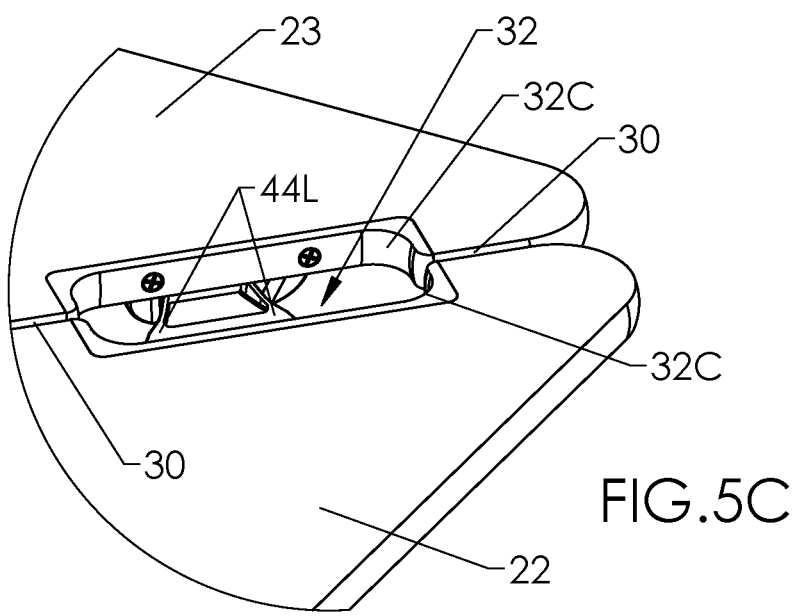
FIG. 5C is an enlarged detail view of the area circled and labeled "FIG. 5C" in FIG. 5, which shows an embodiment of an actuator mechanism control handle/paddle.

FIG. 5C is a bottom view of the area circled and labeled "FIG. 5C" in FIG. 5, to show sections of two adjacent table top sections 22 and 23, the control paddle 42R at/near the right edge of section 22, and the control paddle 43L at/near the left edge of section 23. In this view, one may easily see that the space 32 provides access to two control paddles 42R and 43L, typically for two different people to operate, to adjust their respective two sections 22, 23, or provides access to the two control paddles 42R and 43L by one person who adjusts sections 22, 23 typically at different times/sequentially.

It should be noted that, in preferred embodiments, the control handle/paddles are underneath or substantially underneath the table top section 20, but easily accessible from the top of the sections 20, by putting fingers through the spaces(s) 32. This way, most of the hand, at the time of controlling a given handle/paddle, is on top of and/or above the section 20, and the user need not reach underneath the section 20 with his/her entire hand. It is therefore preferred that the handles/paddles be directly under the spaces 32, and/or extend slightly into the spaces 32, for example, about ½ inch into the handle/paddle's respective space 32 from the handle/paddle's respective right or left edge R, L. Therefore, in certain embodiments, it is preferred that the handle/paddle within a maximum of 1 inch, or more preferably ½ inch, of the right or left edge R, L of the section 20, and not closer to the middle of the underside of the section 20. Plus, the spaces 32 indicate clearly where the handle/paddles are located. Thus, the handles/paddles are easy to locate, reach, and control, especially for patients or physically-challenged people, and their placement prevents the user from having to grope around underneath the sections 20 trying to figure out where and how to accomplish adjustment.

Figure 2:
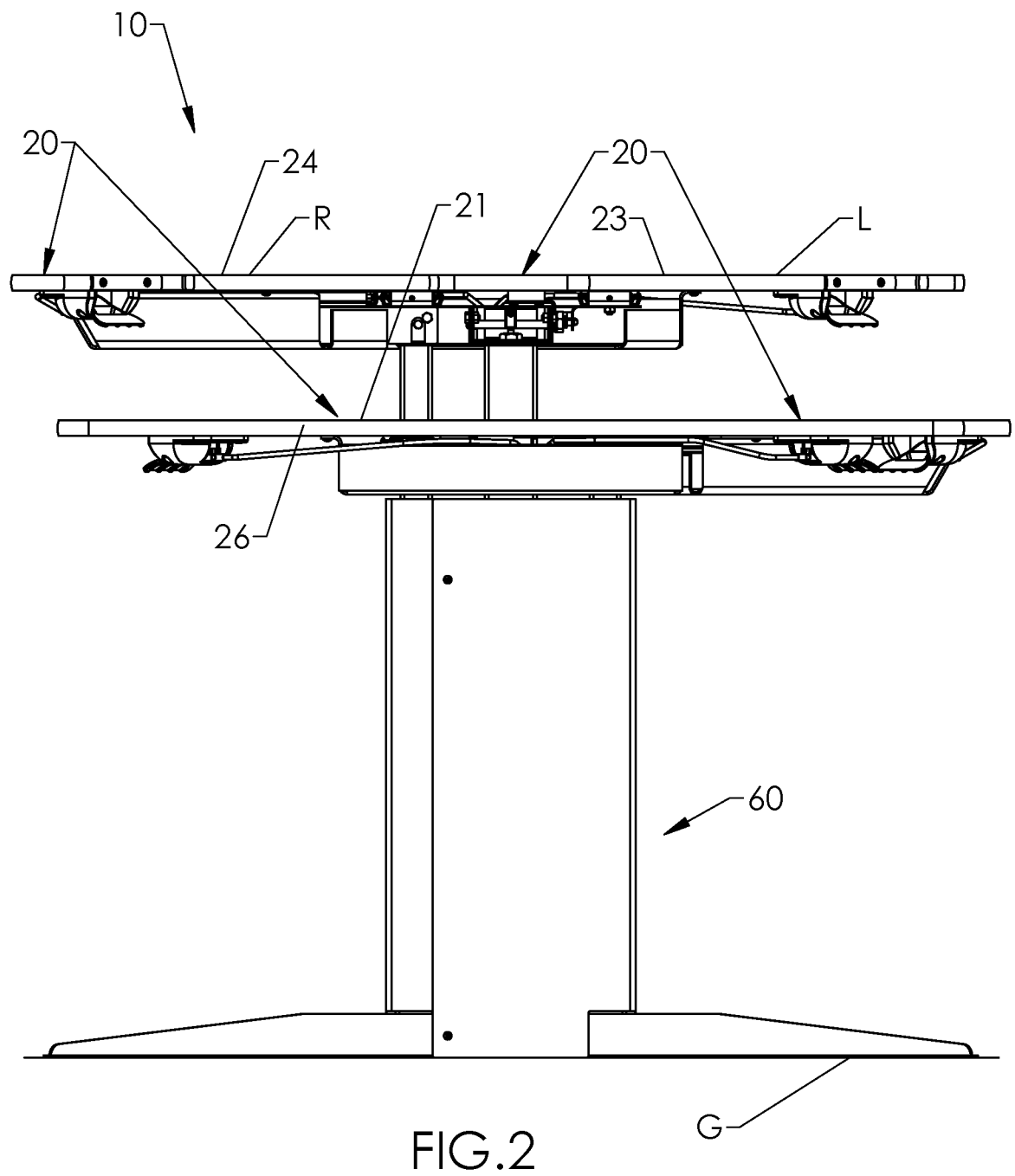
FIG. 2 is a front side view of the table of FIG. 1 in the configuration of FIG. 1.
Figure 3:
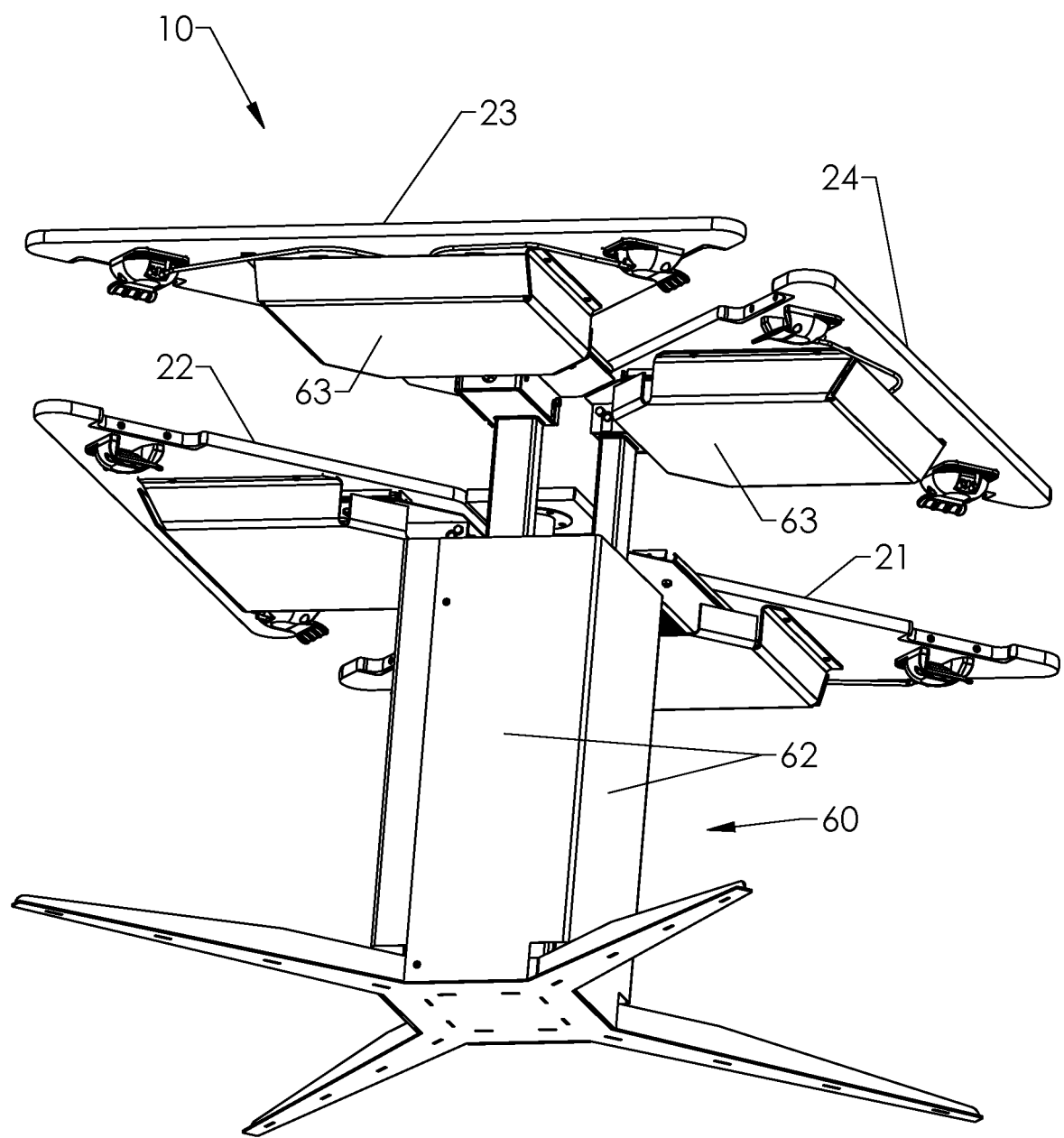
FIG. 3 is a rear-bottom perspective view of the table of FIG. 1 in the configuration of FIG. 1.
Figure 4:
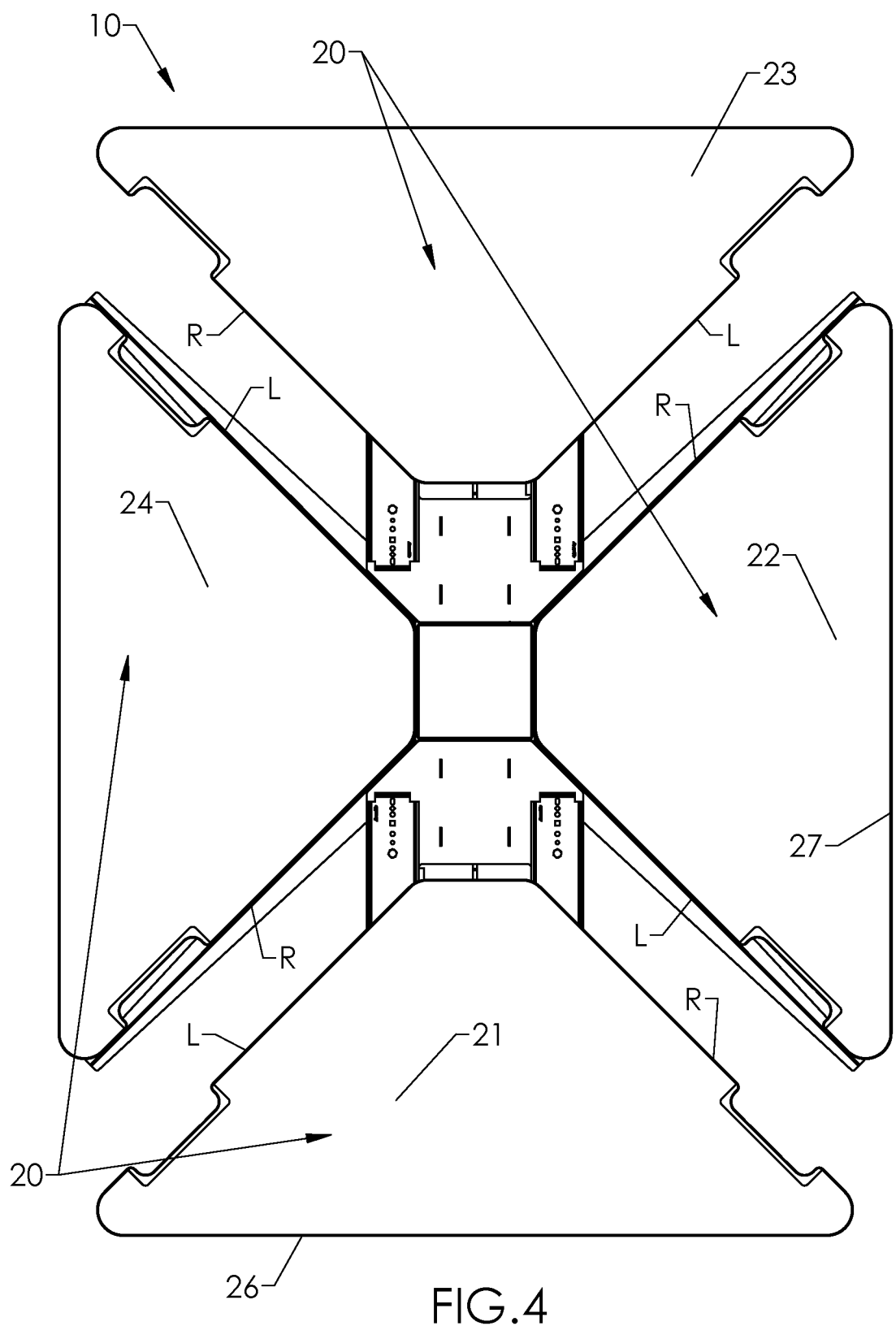
FIG. 4 is a top view of the table of FIG. 1 in the configuration of FIG. 1.
Figure 6:
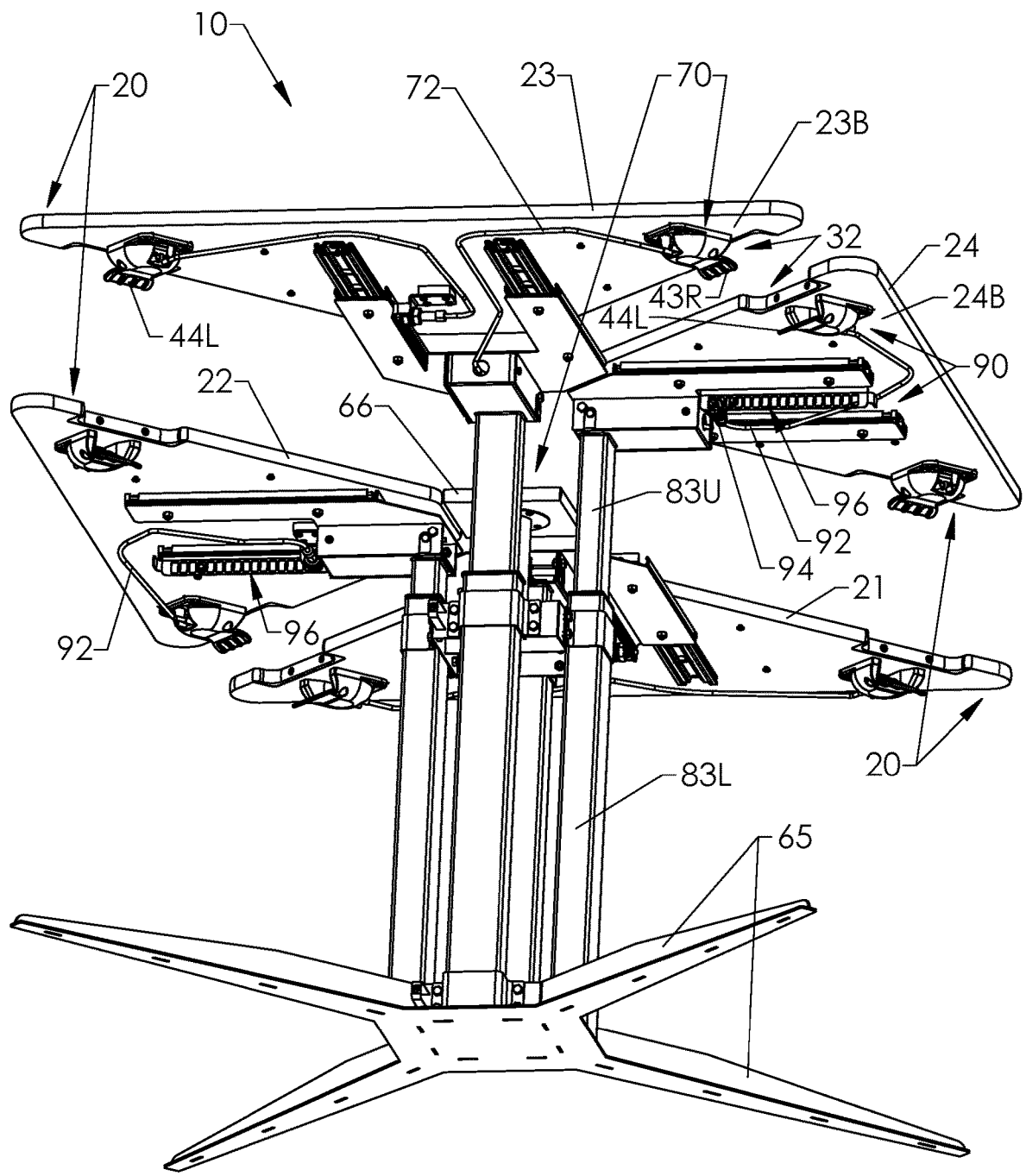
FIG. 6 is a rear-bottom perspective view of the table of FIG. 1 in the configuration of FIG. 1, as in FIG. 3 except that the shielding/covers are removed from under the table top sections and from the center base in order to better show the vertical and horizontal adjustment mechanisms.
Figure 7:
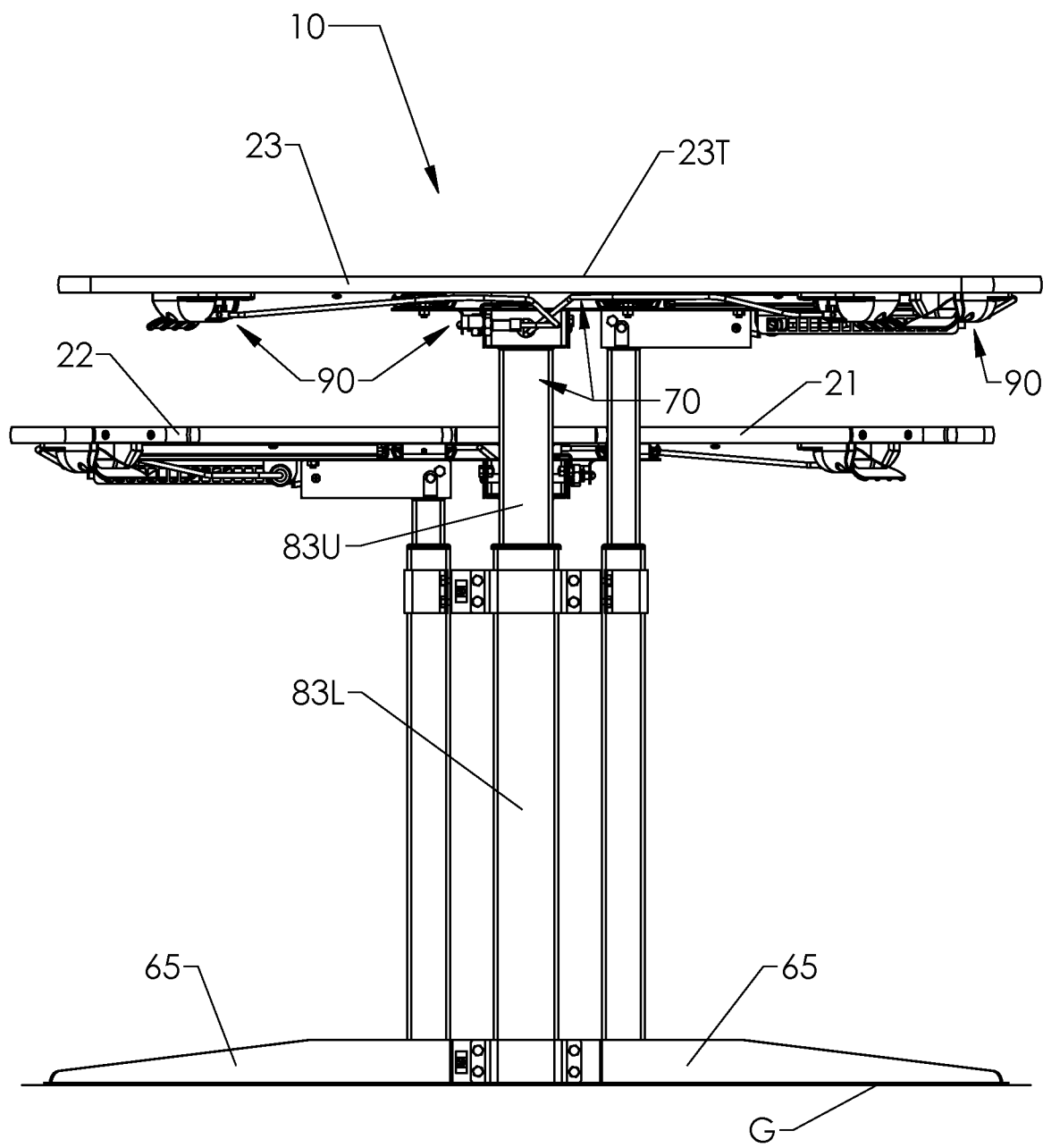
FIG. 7 is a rear-side view of the table of FIG. 6, again with the shielding/covers removed.

FIG. 6 is a rear, bottom perspective view of the table 10 in its adjustment configuration of FIGS. 1-3, with cover panels removed. Thus, FIG. 6 may be understood to be the same view as FIG. 3, but with cover panels removed. FIG. 7 is a rear side view of the table 10 as it is configured and without-cover panels in FIG. 6. As shown in FIG. 3, cover panels 62 may be provided on the center base 60 and cover panels 63 may be provided to cover the horizontal adjustment mechanisms under the table top sections 20, for "dressing up" the appearance of the table 10 and/or shielding/covering moving parts to prevent a person's hands or other body parts, or clothing, from being caught in or hurt by the moving parts.

Vertical Adjustment:

FIGS. 6-12 portray details of one embodiment of the vertical adjustment mechanisms 70. As the four table top sections 20 of table 10 are shaped and sized the same, the vertical adjustment mechanisms 70 of all of the sections 21, 22, 23 and 24 may also be shaped, sized and built the same and may operate the same. Using section 23 and its vertical adjustment mechanism 70 as an example, vertical adjustment mechanism 70 comprises a control paddle 43R, a control cable 72 such as a commercially-available Bowden cable or "bicycle cable" that is actuated by pressing/pivoting the paddle 43R upward toward/against the bottom surface 23B of the section 23 and that extends to and controls a vertically-positioned latching/locking gas spring 73 (see particularly FIGS. 9 and 10). The latching gas spring 73 is provided in a vertical orientation inside a telescoping column having upper and lower telescoping tubes 83U and 83L, preferably with the end providing closest access to the latching valve (inside the gas spring 73) being at the top. Thus, there are four of these telescoping columns containing four gas springs 73, one for each table top section 21, 22, 23, 24, and these columns may be considered portions of, the center base 60. The table section 23 is fixedly connected to the upper telescoping tube 83U and the lower telescoping tube 83L is fixedly connected to the center base 60, for example, to stabilizing feet 65.

The latching/locking gas spring 73 of the vertical adjustment mechanism 70 is preferably of a type that is well-known and commercially available under various names, that is, "latching gas spring", "locking gas spring", and sometimes "locking gas spring with release". Hereafter, the gas spring will be referred to as a "latching gas spring", or simply "the gas spring". The cross-sectional views of gas spring 73 in FIGS. 9 and 10 do not detail the internals of the gas spring 73, as these are well known and commercially available. The latching and release mechanism of the gas spring 73 comprises an internal valve (not shown) that: a) in the unlatched condition, is open for fluid flow inside the gas spring 73, thus allowing the gas spring to move (shorten or lengthen), and b) in the latched condition, is closed to prevent fluid flow in the gas spring 73, thus preventing the gas spring from moving (preventing shortening or lengthening). Said shortening or lengthening of the gas spring will allow shortening or lengthening, typically with the assistance of the user moving the table top section 20, of the telescoping column (83U and 83L), and hence, will lower or raise the section 23 relative to the floor/ground G. Said prevention of shortening or lengthening keeps the table top section 23 in place relative to the floor/ground G. The Bowden cable 72 may be used to unlatch the gas spring 73, for example, by one end of the Bowden cable 72 being operatively connected to the control paddle 43R and the other end being operatively connected to a mechanism 74 at the top end of the gas spring 73 that in turn connects to the internal valve of the gas spring.

The control paddle 43R is biased to stay, when no force is applied by the user, in the latched position that causes the Bowden cable 72, that is, its interior cable, to move to a position that closes the valve of the gas spring 73, thus latching the gas spring 73, as described above. Said latching stops relative movement of the piston rod 75 and the cylinder 76 (schematically shown in FIGS. 9 and 10) of the gas spring 73, and therefore keeps the telescoping column 83U and 83L and the table top section 24 in the position they are when the control paddle 44R is released by the user.

Figure 8:
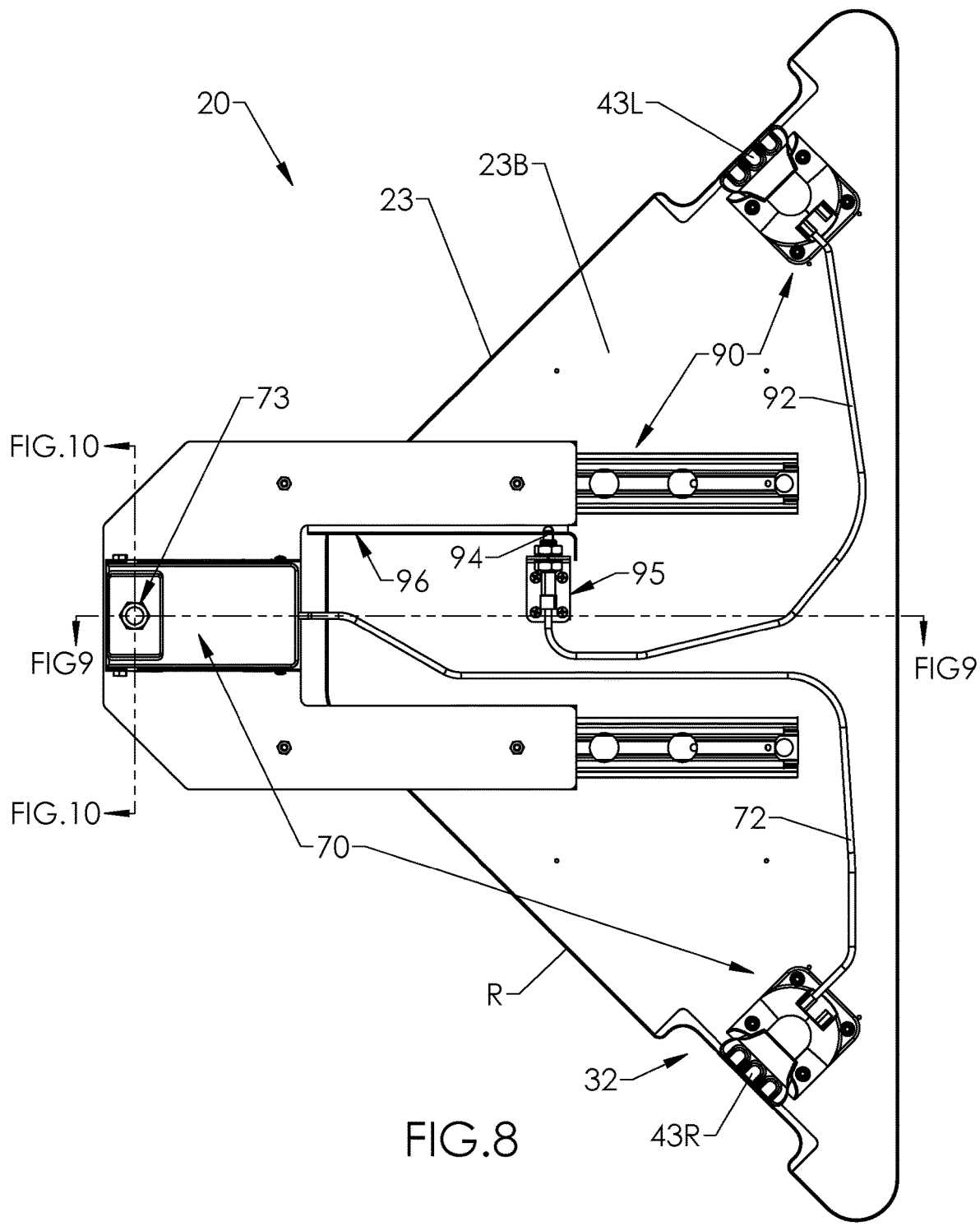
FIG. 8 is a bottom view of one of the table top sections of FIGS. 6 and 7 including its associated portion of the center base, or its "center base portion".

As shown to best advantage in FIG. 8, the control paddle 43R is mounted to the bottom surface 23B of section 23 at/near the right edge of section 23. This mounting position allows, while a user's palm rests on the top surface 23T of section 23 (FIG. 7) and/or on the right edge R of the section 23, for only the user's fingers to pass through the space 32 (by the fingers curling through space 32) to reach and operate the control paddle 43R. When the user operates/grasps the control paddle 43R, the paddle pivots, against the bias, to the unlatched position that causes the Bowden cable 72 to open the gas spring valve and, hence, to unlatch the gas spring 73. As long as the paddle 43R is held in the unlatched positon, the user may move the table top section 23 vertically, to adjust section 23 to a desired height/level. After the vertical adjustment, the user releases the paddle 43R, which closes the gas spring valve via the Bowden cable 72 to latch the gas spring 73, thus latching the table top section 23 in position.

Although alternative vertical adjustment mechanisms may be used in certain embodiments, the latching gas spring is beneficial, as it tends to provide generally smooth, cushioned, and continuous movement within a range of height/level. The "cushioned" or "spring" effect is due to the fluid flow inside the gas spring when it is in the unlatched condition, which is typically is not rapid or sudden, and so the movement of the table top section is slow and smooth and not giving the sensation that the table is "falling", for example. The vertical adjustment mechanism, and especially its gas spring, are preferably designed to allow easy and smooth vertical movement of each respective table top section, for example even by a person of average or less-then-average strength. For example, to supplement the spring effect of the gas spring, bearings, glide-surfaces and/or rollers may be added to the telescoping tubes and/or other portions of the center base 60 to facilitate vertical movement of the table top sections. The vertical adjustment mechanism, and especially its gas spring, is preferably designed to allow vertical movement of the table top section up and down in a range of 6 inches-3 feet, and more preferably in a range of 8 inches to 2 feet, and most preferably about 10 inches to 18 inches.

Horizontal Adjustment:

An exemplary horizontal adjustment mechanism 90 is shown in FIGS. 6-8, and 11-13. Because the sections 20 of this table embodiment, table 10, are shaped and sized the same, the horizontal adjustment mechanism 90 of each of the sections 21, 22, 23 and 24 may also be shaped and sized the same and may operate the same. As examples, the horizontal adjustment mechanism 90 of section 24 is labeled in FIGS. 6 and 7, and the horizontal adjustment mechanism 90 of section 23, which is the same or substantially the same as that of section 24, is labeled in FIGS. 8, 11-13. Referring to FIGS. 6 and 7, horizontal adjustment mechanism 90 comprises a control paddle 44L mounted to the bottom surface 24B of section 24 at/near the left edge of section 24 in a position that allows, while a user's palm rests on the top surface of section 24, for only the user's fingers to pass through the space 32 (by the fingers curling through space 32) to reach and operate the control paddle 44L. The horizontal adjustment mechanism 90 comprises a control cable 92 such as a commercially-available Bowden cable or "bicycle cable" that is actuated by pressing the paddle 44L up toward/against the bottom surface 24B of the section 24. The Bowden cable extends to and unlatches a pin 94, which is part of a pin unit 95 mounted on the bottom surface 24B, by pulling the pin 94 out from an apertured horizontal adjustment track 96 that is connected to the upper telescoping tube 83U of the center base 60 of the table 10.

Referring now to FIGS. 8 and 11-13, a Bowden-cable 92 operated pin 94 and apertured track (96, 98) system of the horizontal adjustment system are shown in more detail on the bottom side 23B of section 23. A horizontally-elongated track 96 is fixedly connected to center base 60, typically via fixed connection to upper telescoping tube 83U, and track 96 comprises many track holes 98 located in an elongated row extending toward the outer edge of the section 23. A sliding rail 99, and a pin unit 95 are fixed to the bottom surface 23B of section 23. The rail 99 slides longitudinally inside the track 96, to guide smooth horizontally movement of the section 23 relative to the track 96 and, hence, relative to the center base 60. When the pin 94 of the pin unit 95 extends into any hole 98 on the track 96, the pin 94 prevents relative movement between the table top section 23 and the track 96, and hence prevents relative movement between the table top section 23 and the upper telescoping tube 83U and the entire center base 60. The horizontal adjustment mechanism, and especially the track system, are preferably designed to allow easy and smooth horizontal movement of each respective table top section, for example even by a person of average or less-then-average strength. For example, bearings, glide-surfaces and/or rollers may be included/added to the track system to facilitate horizontal movement of the table top sections.

Paddle 43L is biased to the latched position, in which the cable 92 pushes the pin 94 toward the track 96 and therefore into a hole 98 in the track. Operating/grasping the control paddle 43L to pivot the paddle, against the bias, toward the bottom side 23B of the table top section 23 (unlatched positon), operates the Bowden cable 92 to pull the pin 94 away from the track 96, and therefore out of whichever of the holes 98 it currently resides. This unlatched pin position allows relative movement of the pin 94 and therefore the table top section 23, unlatching the horizontal movement of the table top section 23, so the user may slide the section 23 horizontally inward or outward. Upon sliding the section 23 to a desired position, the user releases the paddle 43L, and said bias serves to move the paddle back to the unlatched position, which operates the Bowden cable 92 to push the pin 94 toward the track 96 and into the closest hole 98, thus, relatching the table top section 23 in that adjusted positon.

It is preferred that the holes 98 of the track 96 be close together, for example, spaced apart by only ½ to ¾ inches, for example, to allow small adjustments in the horizontal positon to be made. While such a horizontal adjustment mechanism is therefore not "continuous" through a range, it is "substantially continuous" and may be designed to allow small incremental adjustments, which may be considered "substantially continuous adjustments", through a range of 8 inches to 2 feet, and more preferably about 10 inches to 18 inches.

Figure 11:
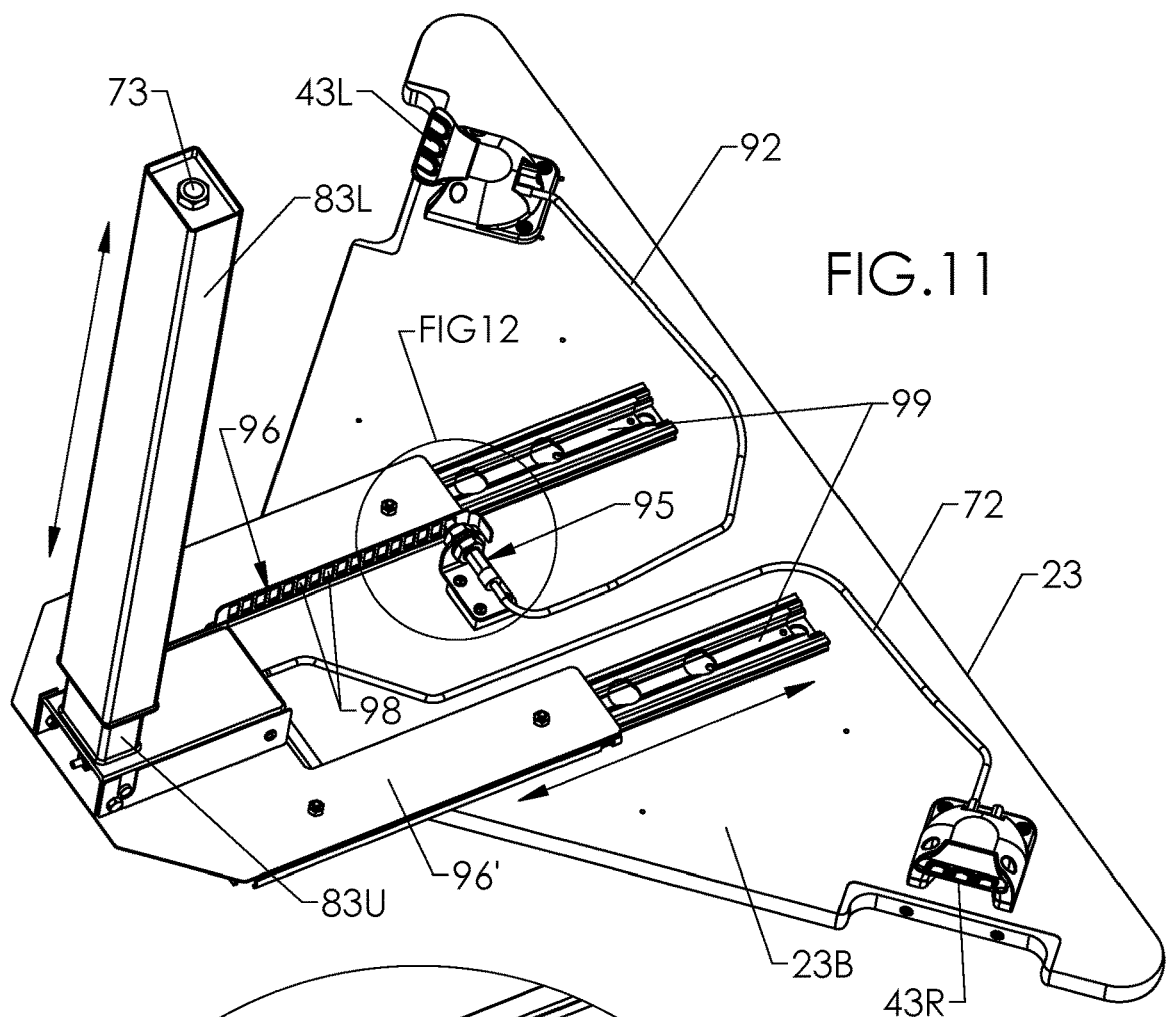
FIG. 11 is a bottom perspective view of the table top section of FIGS. 8-10, including its associated center base portion and including arrows indicating horizontal and vertical adjustment, wherein the table top section in this view is: a) in an outward-extended position so that it is horizontally distanced from the center base portion, and b) close to the center base portion, that is, into a vertically lowered position relative to a floor/ground on which the center base of the table would normally rest.
Figure 12:
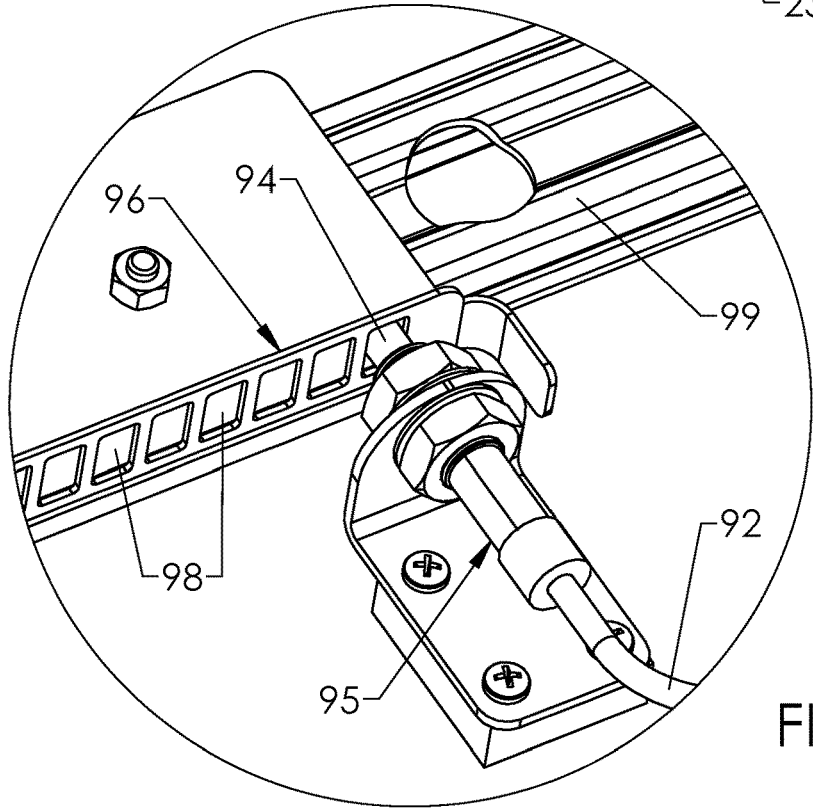
FIG. 12 is an enlarged detail view of the area circled in FIG. 11, showing certain details of the horizontal-adjustment mechanism embodiment of FIG. 11.
Figure 13:
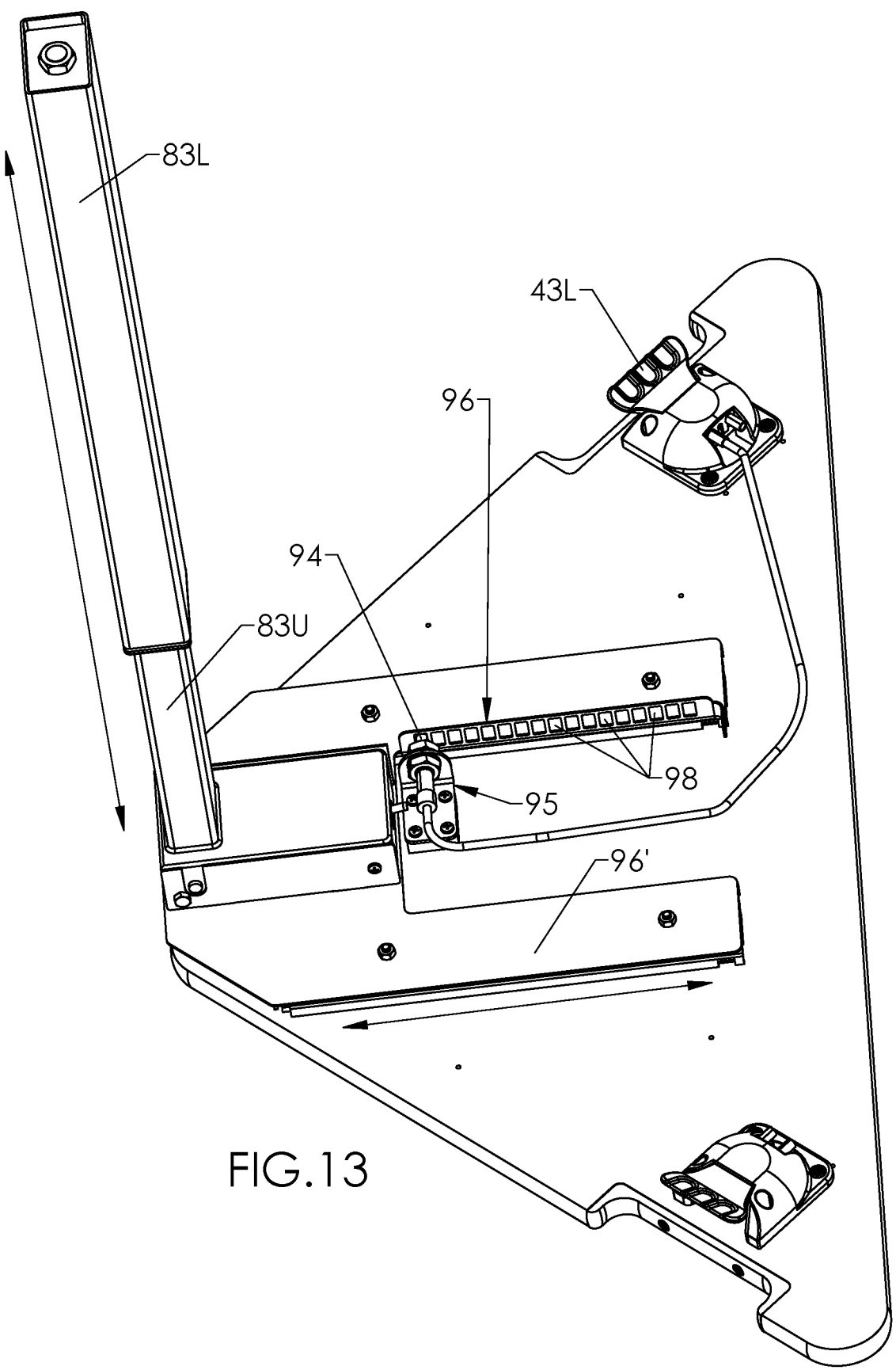
FIG. 13 is a bottom perspective view of the table top section of FIGS. 8-12, including the associated center base portion and including arrows indicating horizontal and vertical adjustment, wherein the table top section in this view is: a) adjusted from its position in FIG. 11, into an inward position, so that it is horizontally close to the center base portion, and b) adjusted from its position in FIG. 11, to be distanced from the center base portion, in other words, into a vertically raised position relative to a floor/ground on which the center base of the table would normally rest.

It will be noted in FIGS. 11 and 13, that the track 96 (a "first arm") is provided in a U-shaped structure comprising a second arm 96' that does not necessarily comprise holes and does not necessary cooperate with any pin unit. Further, it will be noted that there are two rails fixedly connected to the bottom surface 23B of section 23, and that the U-shaped structure slidably receives and cooperates with the two rails 99. For example, FIGS. 11 and 12 illustrate that, upon partial horizontal extension away from the center base 60 (including telescoping tube 83U), the rails 99 are partially, but not entirely, outside of the track/arms 96, 96'. And, FIG. 13 illustrates that, upon full horizontal retraction toward the center base 60 (including telescoping tube 83U), the rails 99 are entirely retracted into the track/arms 96, 96'. This parallel double arm and double rail system, wherein two rails 99 are at all times are at least partially received within the track(s)/arm(s), may provide extra smoothness of horizontal movement and extra stability and security that prevents the section 23 from twisting side-to-side during adjustment or during use.

The vertical and horizontal adjustment mechanisms 70, 90 are preferably designed so that they unlatch their respective table top sections 20 when the control paddles are operated/pivoted by curling one's fingers through space 32 and grasping/squeezing the paddle(s) against the bottom surface of the top section 20. This way, while operating/grasping the control paddle(s) to unlatch the table top, the user is also grasping/gripping the edge and top surface region of the section 20, so that the user can move the unlatched top section as desired. Further, the sections 20 of the preferred embodiment 10 are generally triangular in shape, with the outer region of the section 20 being wider than the inner region of the section 20. This triangular shape, and the right and left "hand-hold notches" in the right and left edges of the sections 20 that create the spaces 32, make is easier for the user to pull out the section 20 horizontally to bring the section 20 closer to or over the user's lap, as the user sits in a chair or a wheel chair for example. To pull out the section 20 horizontally, the user may pull the section 20 at least partly by pulling outward against the corners 32C of spaces 32, that is, the generally 90 degree corners of the hand-hold notches in the right and left edges of section 20 (FIGS. 5A and B).

In certain embodiments, operating/grasping the vertical and the horizontal adjustment mechanism paddles, and adjusting the vertical and the horizontal positions of the table top section, may be done at the same time or close in time, as desired. For example, the vertical and the horizontal adjustment mechanisms may be unlatched by operating/grasping the relevant vertical or horizontal control handle (or both if the user is comfortable with and capable of doing so), moving the table top section either vertically or horizontally respectfully (or both), and then, upon reaching the desired position, the user will release the control paddle(s) to latch the top section. After said release/latching, the various table top sections are in effect "customized in position" for different people, whose use of the sections 20 may proceed for a meal, socializing, card-playing, etc., typically without the users needing to further touch or operate the control paddles.

It will be understood that, in certain embodiments, alternative numbers of table top sections 20 may be provided, and that they may be arranged around a center base or other leg/stand differently than portrayed in the Figures. For example, in certain embodiments, 5, 6, 7 or 8 sections 20 may be provided, with appropriate changes in dimensions being made. In some tables, the sections 20 may be other than triangular or generally triangular.

It will understood that alternative center base 60 designs and/or alternative stabilizing feet 65 may be used, for example for different overall shapes and/or for different aesthetic appearances, with a preferred feature of the alternative designs being that they accommodate and/or help accomplish the desired adjustment mechanisms, and allow chairs and wheel-chairs to be pulled or rolled up toward the table. The top end 66 of the center base 60 is visible in several of the Figures, and is labeled in FIGS. 5 and 6, with the four table top sections 20 symmetrically provided around the center base 60 and its top end 66. In alternative embodiments, the top end of the center base 60 may be not visible from the top of the table, for example, covered by inner corners or extensions from the table top sections. It is desired that much or all of the table top, for example, 80-100 percent of the table top or 90-100 percent, be provided by the top surfaces of the moveable table top sections 20. In certain embodiments, however, the top end of the center base 60 may be visible and non-moving/non-adjustable (as in the Figures), to serve as a stationary platform for receiving utilitarian or decorative objects, such as condiments, napkins, flowers, a schedule placard, a clock, or a speaker or video screen, for example.

Alternative Embodiments

Referring to FIGS. 14-23, there are shown two alternative embodiments that include most of the same or very similar structural and operational features as are discussed above for table 10 and portrayed in FIGS. 1-13, as will understood from this disclosure and from viewing the drawings. Where a particular feature/aspect, a particular embodiment, and/or particular step(s) of operation are disclosed herein in the context of table 10 and FIGS. 1-13, that feature/aspect, embodiment, and/or operation step can also be used, to the extent appropriate and effective, in the context of tables 100, 200 and in the invention generally.

For example, embodiments 100, 200 include multiple table top sections 120, 220, and vertical and horizontal adjustment mechanisms using gas springs and horizontally-sliding track systems, respectively, that may be the same or similar to those of table 10. As discussed above for table 10, the adjustment mechanisms of each table top section, and the control actuators of each adjustment mechanism, preferably are separate and independent from the adjustment mechanisms and manual control actuators of all the other top sections. Preferably, the adjustment mechanism and the manual control actuator for the vertical adjustment of a given table top section is separate and independent from the adjustment mechanism and the manual control actuator for the horizontal adjustment of that given table top section. Thus, preferably, two separate and independent control actuators are provided on each table top section, so that one controls the vertical adjustment, and the other controls the horizontal adjustment. Further, preferably, the two separate and independent control actuators are manually operated, so that a person sitting standing or sitting at a given table top section can manually operate the actuator to adjust said table top section vertical position and the horizontal position, either sequentially in any order or by operating control actuators at the same time. Said person standing or sitting at the given table top section may be a staff member of a healthcare or other care facility, family member, or even the person about to use the table top section if that person is physically capable of grasping one or both of the manual actuator(s) and also applying some force to the table top section to move the table top section in the desired direction(s) of adjustment. As discussed above regarding table 10, the preferred adjustability and the preferred arrangement of the multiple table top sections radially spaced around a vertical centerline of the table provide a sense of inclusiveness, camaraderie and community for the users of the table. Each user sitting or standing at a section of the table 100, 200 is the same distance, or a similar distance even when the table sections are adjusted horizontally, from the center/vertical-centerline of the table, and so each user has a good social opportunity and experience at the table.

Figure 14:
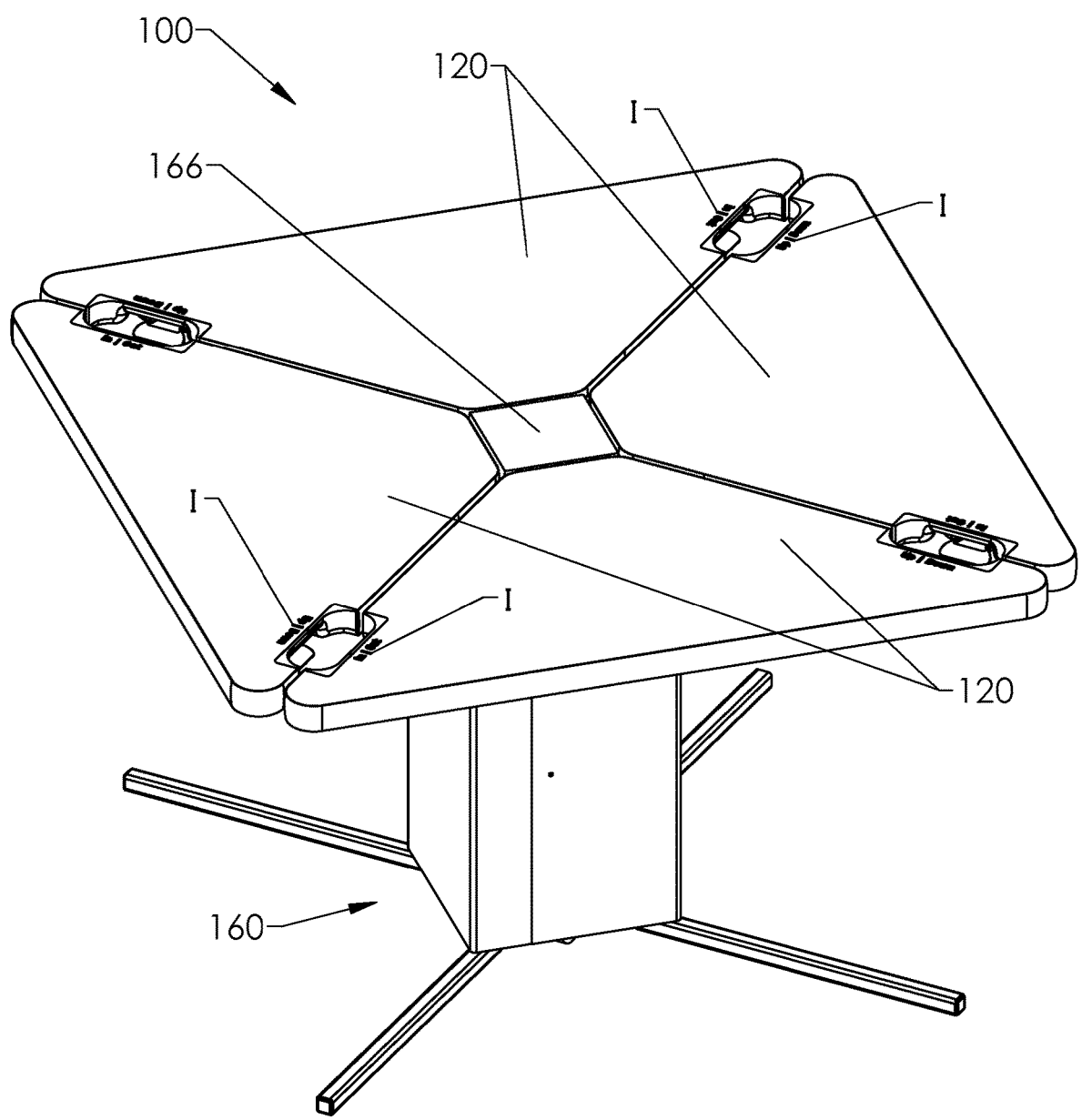
FIG. 14 is a top perspective view of an alternative embodiment of the invented table, with four table top sections adjusted vertically and horizontally into an exemplary configuration wherein all table top sections are at the same level above floor/ground and are fully-inward near/against the center base top end at the center of the table.

Referring to FIG. 14, table 100 includes four table top sections 120 (all sections being numbered 120 in FIGS. 14 and 15 for simplicity) in the same arrangement as in table 10, around the top end 166 of the center base 160. The handles/paddles for controlling vertical and horizontal adjustment are located generally in the same positions as in table 10. Indicia I, such as "up/down" and "in/out", is added to the top surface of the table top sections adjacent to the handles/paddles, to indicate which handle/paddle controls which adjustment (vertical or horizontal), for helping users of the table 100 to easily perform the adjustments.

Figure 15:
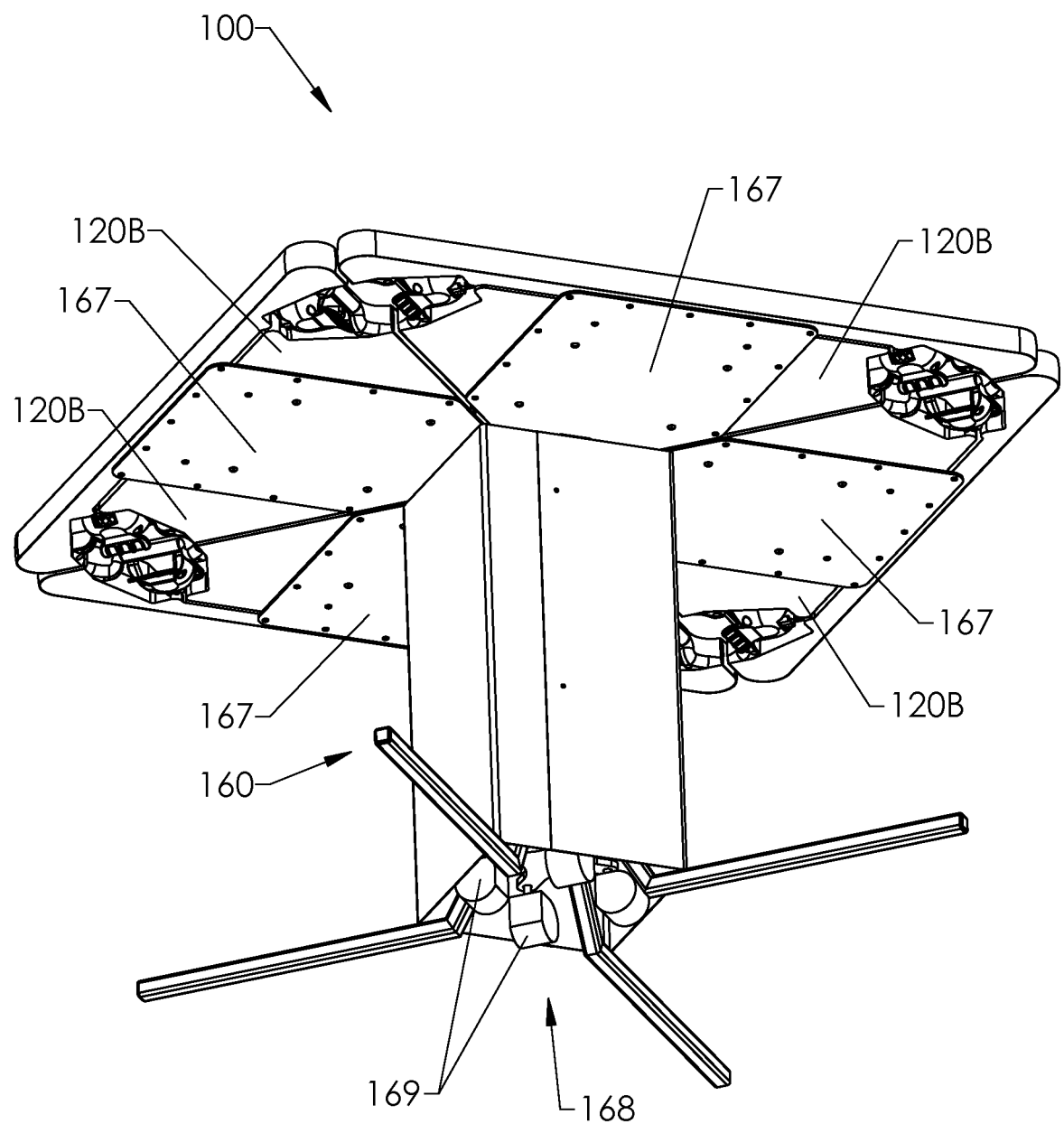
FIG. 15 is a bottom perspective view of the table of FIG. 14.

FIG. 15 illustrates certain other features of table 100 that are modified compared to table 10. Table top sections 120 are each thicker than sections 20 of table 10. Each section 120 comprises one or more recesses in its bottom surface 120B, for example, for receiving the handle/paddle mechanisms, the cables for the vertical and horizontal adjustment mechanisms, and the track system for the horizontal adjustment system. At least some portions of the recess(es) are preferably covered by section-bottom panels 167, to cover and/or substantially-hide the cables and the track system. Said recesses are not shown in FIG. 14 or 15, but are shown (R) uncovered and therefore visible in FIGS. 17, 19, 20, 21 and 22 portraying table 200. Said recess(es)R, including recess portions/branches R1, R2 and R3 as discussed further below, allow equipment such as the handle/paddles, the track system, and the cables to be recessed in the underside of the sections 120, 220 for increased user safety and mechanism reliability and durability. Recessing, or recessing and covering, the equipment helps prevent a finger, hand, or leg from being pinched or scraped, tends to prevent clothing from being caught in/on the equipment, and tends to prevent a user from accidently or intentionally damaging or disconnecting any portion of the equipment.

FIG. 15 also illustrates a roller system 168 at/near the bottom of the center base 160, for helping with moving the table 100 to change its location in a room or a building, for example. Rollers 169 at the bottom end of the system 168 may be biased downward and/or adjustable and latchable downward to move/push the rollers 169 against the floor to assist in rolling/sliding the table around the room/building. For example, people moving the table 100 may lift the table slightly above the floor, and operate an actuator (not shown)

that releases a spring-bias or other mechanism that moves/pushes the rollers 169 downward to contact and roll along the floor. This way, by lifting the table only a small amount up off the floor, for example, 1-2 inches or even a fraction of an inch, people may roll and easily maneuver the table to a desired location, typically with reduced chance of damage to the table and the floor.

FIGS. 16-23 illustrate table 200, which, like table 100, has indicia I on the table top sections 220 near the handles/paddles, thicker table top sections 220, recesses R (including recesses R1, R2, and R3) in the bottom surfaces 220B of the sections 220, and a roller system 268 for helping with carrying/moving the table. While not shown in FIGS. 16-23, table 200 will preferably have section-bottom panels installed under each section 220, for example panels the same or similar to panels 167 on table 100, to cover some or substantially all of the recesses, particularly recess portions that hold the cables and the track system.

Figure 16:
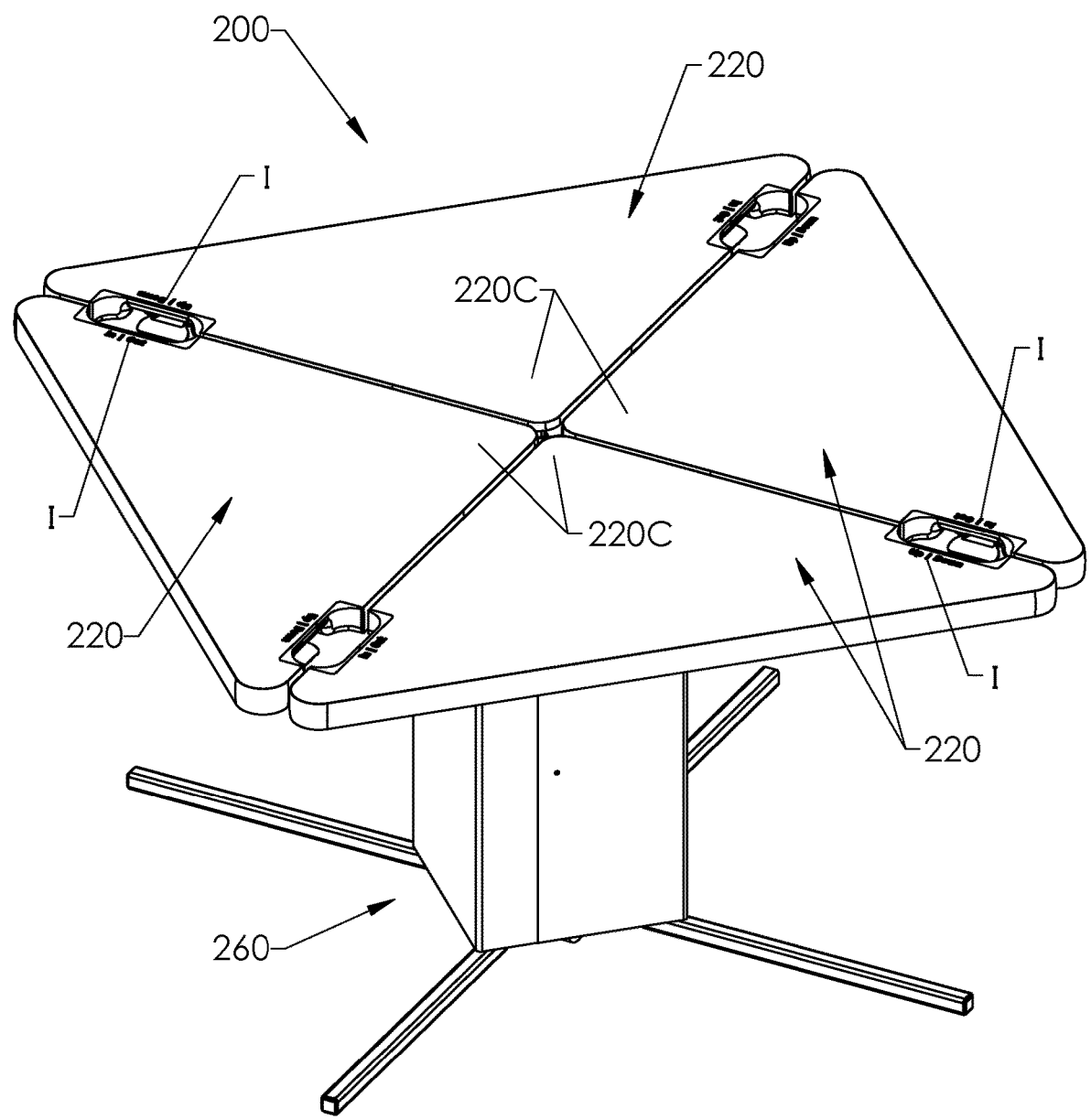
FIG. 16 is a top perspective view of another alternative embodiment of the invented table, with four table top sections adjusted vertically and horizontally into an exemplary configuration wherein all table top sections are at the same level above floor/ground and are fully-inward near/against each other with no center base top end or platform between the inner corners of the four sections.

Referring to FIG. 16, table 200 includes four table top sections 220 (all numbered the same, for simplicity) in the same arrangement as in tables 10 and 100, except that the top end of the center base 260 is below the sections 220 and not visible when looking at the top of the table in FIG. 16. Thus, table 200 has no central platform or central section between the inner corners/edges of the sections 220 in FIG. 16. The inner corners 220C of the sections 220 meet in the center/middle of the table top when the sections 220 are all at the same level above the floor/ground. A small gap may be between the inner corners 220C, but said small gap is preferably not large enough for items, such as table-wear or commonly-used tools such as pencils, to fall through the gap. Thus, the top of table 200 may be described as not having a center platform, central section, and/or as not having an immovable/non-adjustable center section.

The handles/paddles for controlling vertical and horizontal adjustment of table 200 are located in the same positions as for table 100. Indicia I are added to the top surface of the table top sections 220 adjacent to the handles/paddles, to indicate which handle/paddle controls which adjustment (vertical or horizontal), for helping users of the table 200 to perform the adjustments.

Figure 17:
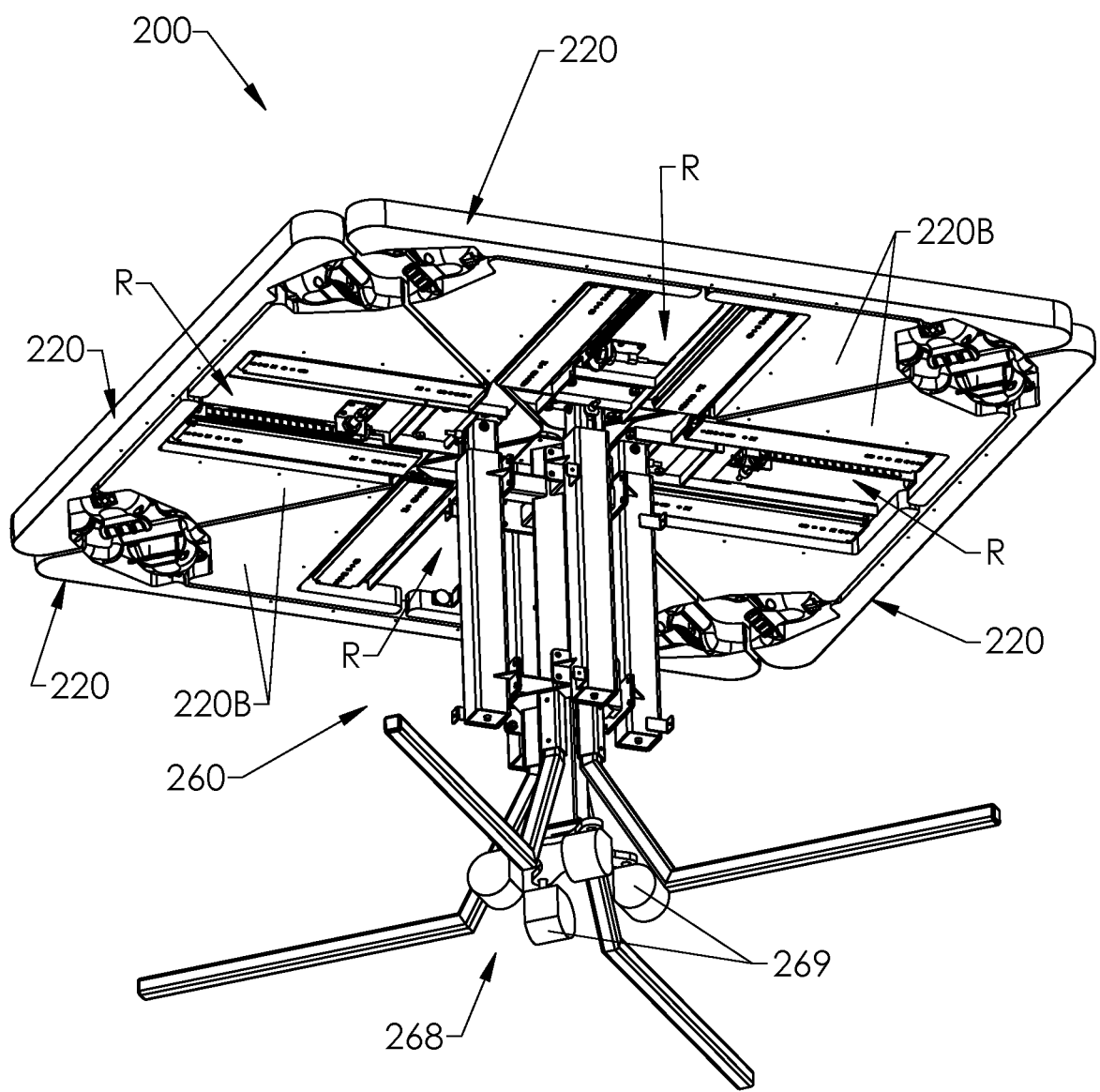
FIG. 17 is a bottom perspective view of the table of FIG. 16, wherein the center base shielding/covers have been removed.

FIG. 17 illustrates certain other features of table 200 that are modified compared to table 10, preferably in ways similar or the same as in table 100. Table top sections 220 are each thicker than sections 20 of table 10. Each section 220 comprises a recess R in its bottom surface 220B, for holding the handle/paddle mechanisms, the cables for the vertical and horizontal adjustment mechanisms, and the track system for horizontal adjustment system.

Figure 18:
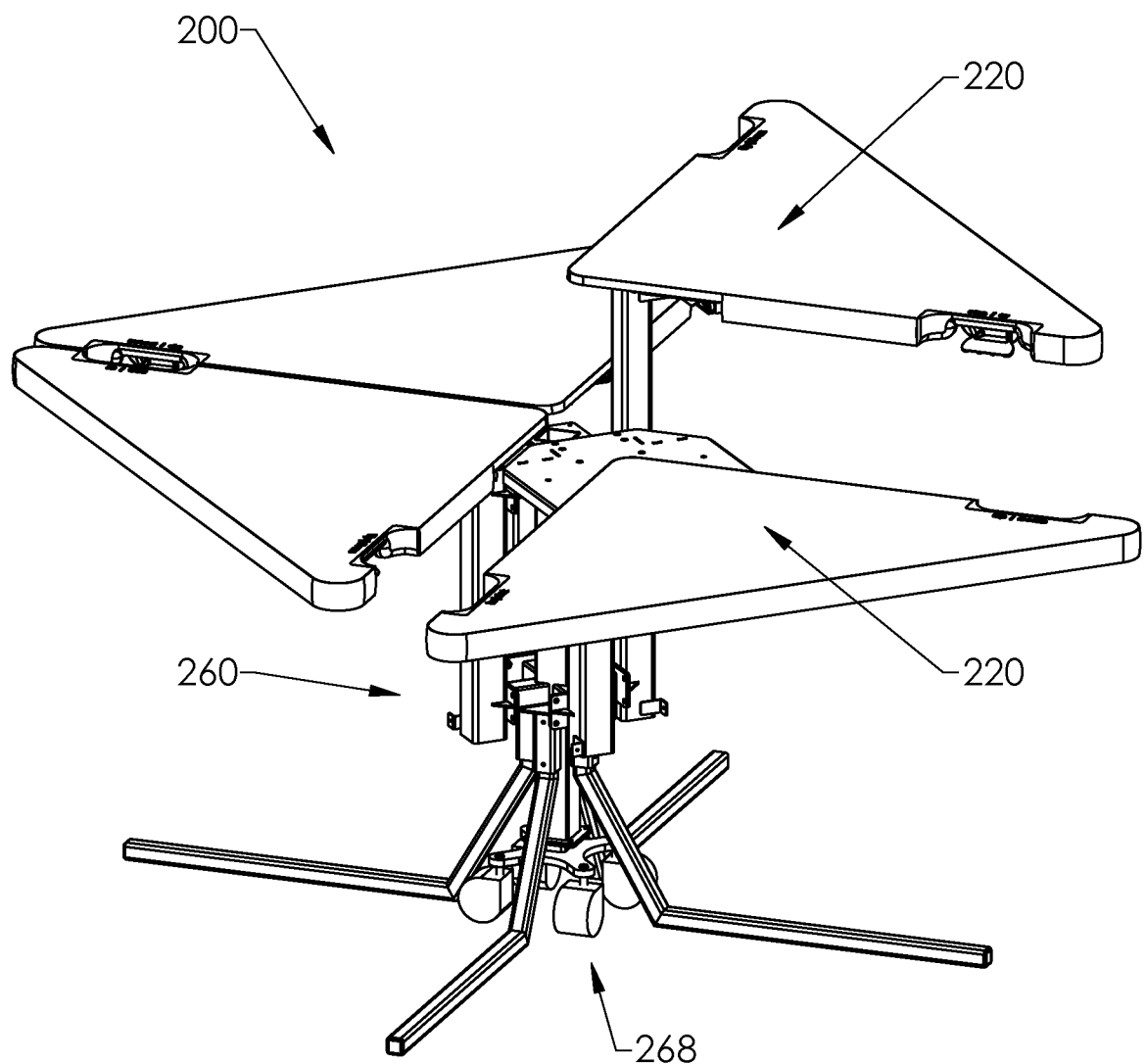
FIG. 18 is a top perspective of the table of FIGS. 16 and 17, with the center base shielding covers removed, wherein one table top section is adjusted to be higher than the other three sections, and another table top section have been adjusted outward away from the other three sections.

FIGS. 17 and 18 have the center base covers removed and illustrate a roller system 268 at/near the bottom of the center base 260, for helping with carrying/moving of the table 100. As described above for table 100, rollers 269 at the bottom end of the system 268 may be biased downward and/or adjustable downward to move/push the rollers 269 against the floor to assist in rolling/sliding the table around the room/building. For example, as in table 100, people moving the table 100 may lift the table slightly above the floor, and operate an actuator (not shown) that releases a spring-bias or other mechanism that moves/pushes the rollers 269 downward to contact and roll along the floor.

FIG. 18 illustrates adjustment of one of the table top sections vertically upward from the others, and adjustment of another one of the table top sections horizontally outward from the others. As will be understood from the discussion of table 10, preferably all of the sections of table 200 are adjustable vertically and horizontally independently and separately from each other section, and preferably the vertical and horizontal adjustment of any given section may be done in any order or at the same time if desired.

Figure 19:
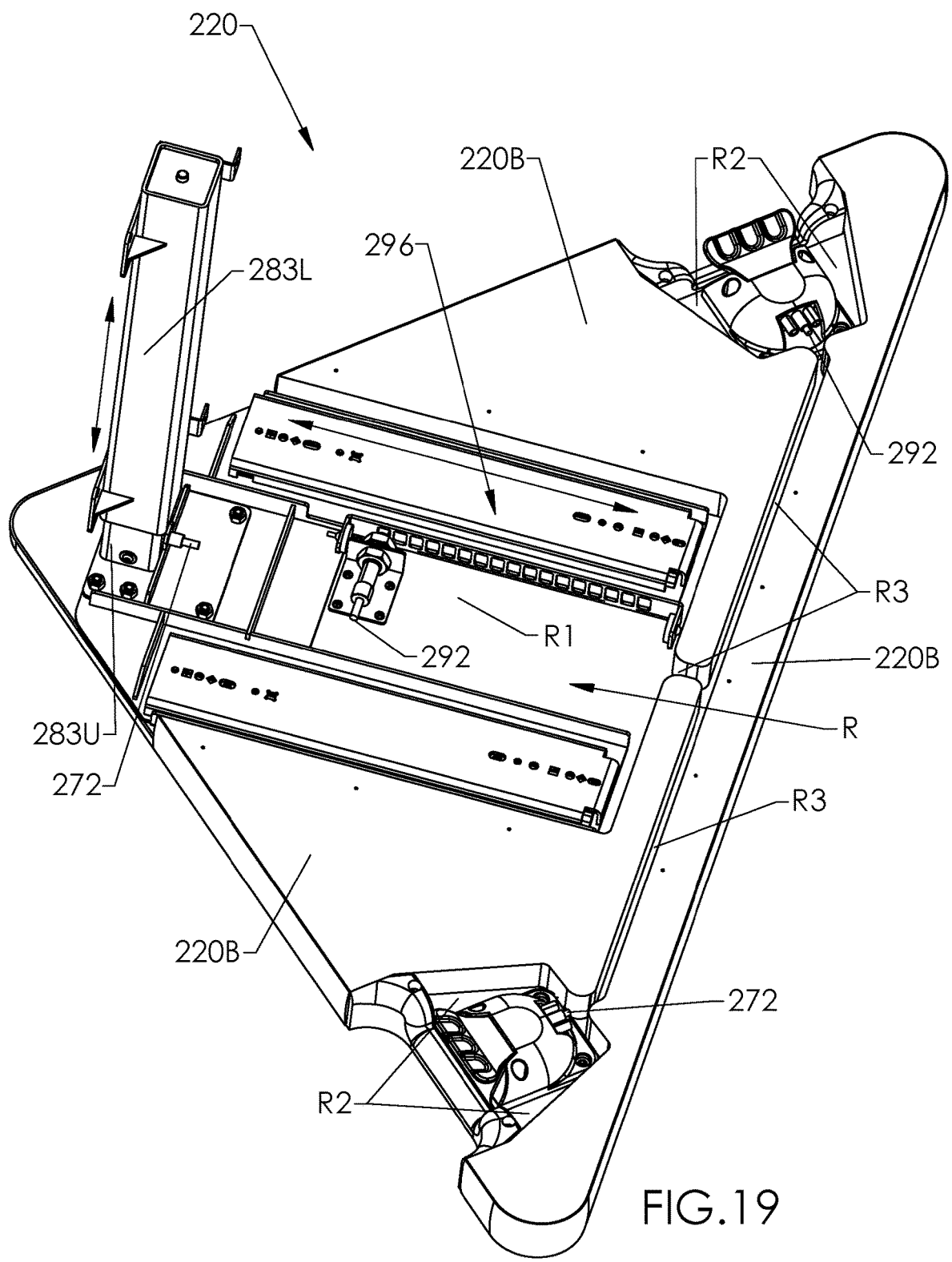
FIG. 19 is a bottom perspective view of one of the table top sections of the table of FIGS. 16 18, with the section adjusted fully-inward toward its center base portion, and with the vertical adjustment system shortened/retracted to a reduced/minimum length/height, which would serve to lower this table top section relative to other sections and/or to the floor/ground.

FIG. 19, which view is similar to that of FIG. 13 for table 10, shows how recess(es) are provided in the underside (bottom surface 220B) of a section 220. Recess R may be described being in the bottom surface 220B and having multiple recess portions or "branches" R1, R2, R3. Recess portion R1 holds the track system 296 of the horizontal adjustment mechanism. Recess portions R2 hold the handles/paddles for operating/actuating both the vertical and the horizontal adjustment mechanisms. Recess portions R3 are relatively narrow slits/channels for receiving the vertical and horizontal adjustment mechanism cables 272 and 292 as they extend from the handle/paddles to the gas spring inside the telescoping upper and lower tubes 283U, 283L, and to the track system 296, respectively. Note that only portions of the cables, at the handles/paddles, the track pin, and at the telescoping tubes, are shown in FIGS. 19-22, for simplicity; the locations and length of the entire cables as they extend from the handles/paddles to their respective adjustment equipment will be understood from viewing FIGS. 6, 8 and 11, for example.

Figure 20:
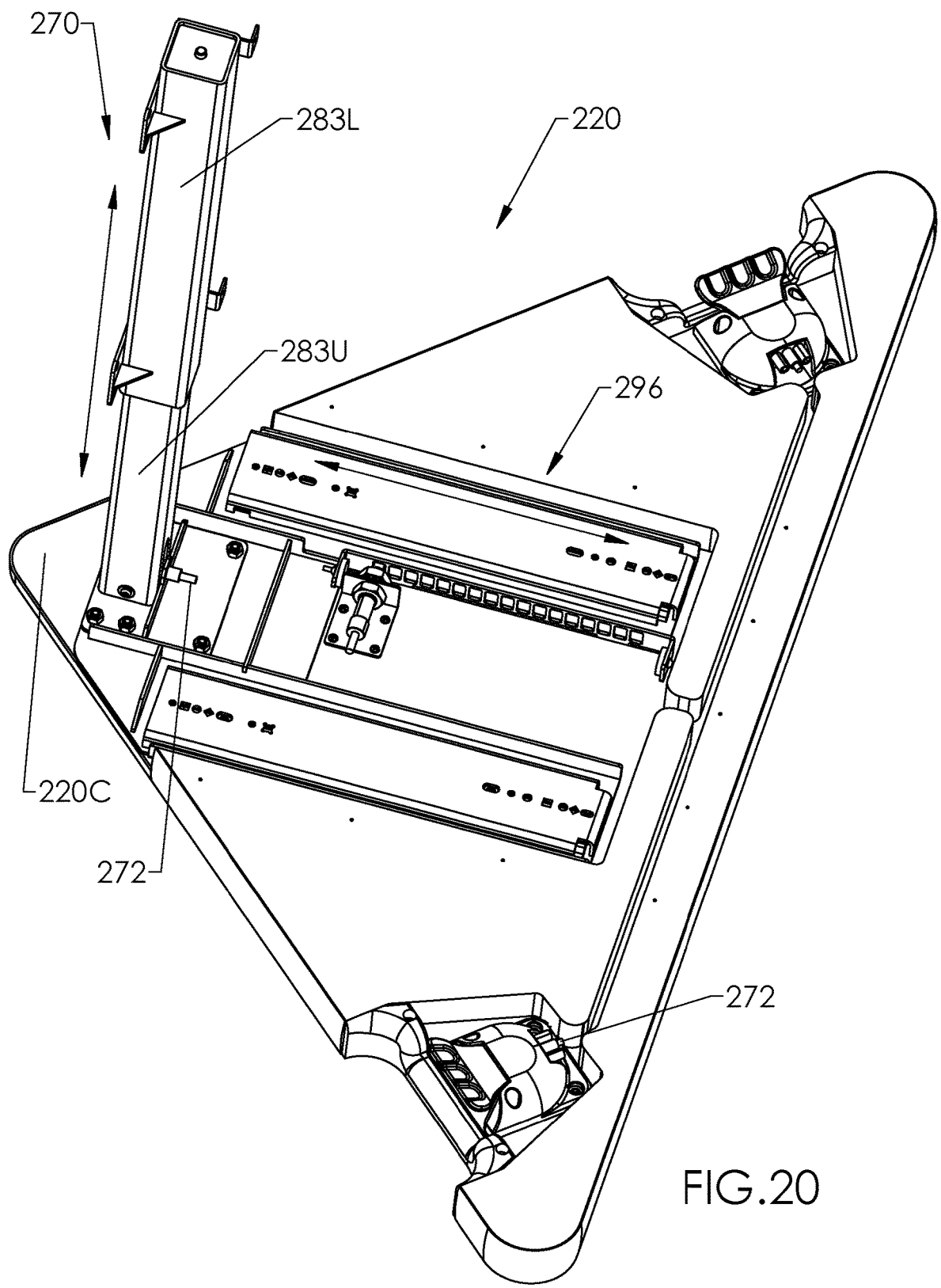
FIG. 20 is a bottom perspective view of the table top section of FIG. 19, with the section still fully-inward but with the vertical adjustment system lengthened/expanded to an increased length/height, which would serve to raise this table top section relative to other sections and/or to the floor/ground.

FIG. 20 illustrates that actuation of the vertical adjustment mechanism 270, as discussed above for table 10, results in relative movement of the upper and lower telescoping tubes 283U, 283L, and therefore, relative movement of the section relative to the center base of the table, due to lengthening and shortening (expansion and retraction) of the gas spring (not visible in this view) inside the tubes 283U, 283L. In FIG. 20, the track system 296 of the horizontal adjustment mechanism has slid and latched section 220 in the fully-inward position. In this fully-inward position, the section 220 may be seen to extend horizontally past this section's telescoping tubes 283U, 283L to place the inner corner 220C to the left of the sheet in this bottom view. One would describe a top view of this configuration as the section 220 and its inner corner 220C extending above and over the telescoping tubes 283U, 283L.

From the description above regarding table 10 and from FIGS. 1-13, one may understand how section 220 is horizontally moveable out from its position in FIG. 20, for example, to a position like the table top section closest to the viewer of FIG. 18. FIGS. 11 and 12 regarding table 10 are particularly illustrative of how the track system 296 may be structured and operate, that is, part(s)/piece(es) of the track system are fixed/connected to the underside of the section and slide (when unlatched via the pin) relative to part(s)/piece(es) of the track system that are fixed/connected to the center base of the table, for example, bracket/plate structures to which the upper telescoping tube 283U is fixed. The relative horizontal sliding of the portion(s) fixed/connected to the section 220 and the portion(s) fixed/connected to the center base 260, accomplish the horizontal adjustment.

FIG. 21 and cross-section FIG. 22 further illustrate the section 220 of FIGS. 19 and 20, wherein recess R comprises portions/branches R1, R2, and R3. In both of FIGS. 21 and 22, the track system 296 and handles/paddles 244L, 244R may be seen in recesses R1 and R2, respectively. In FIG. 21, portions of cables 272, 292 are visible and will be understood to run through the narrow split/channels of recess R3.

Figure 23:
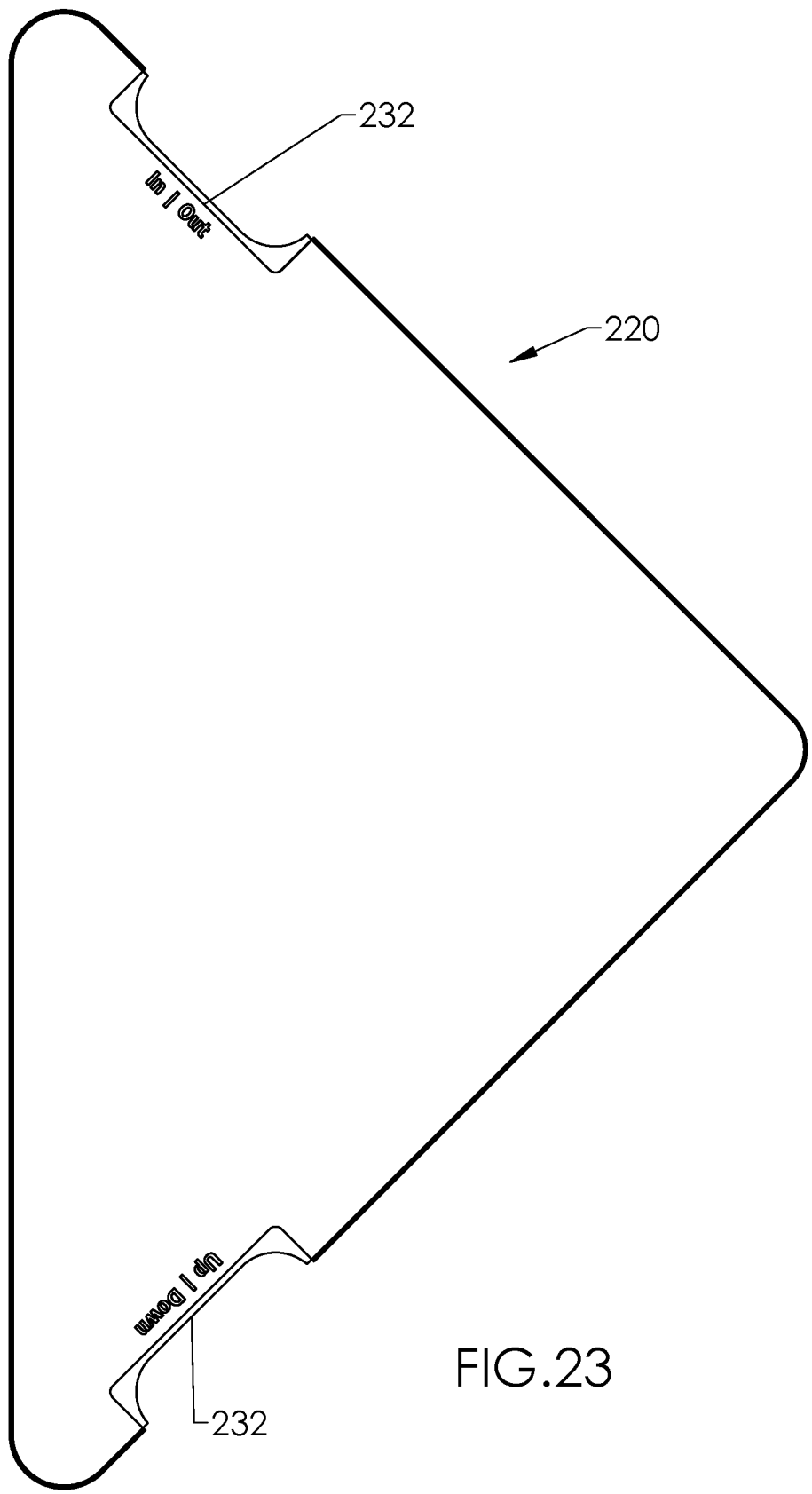
FIG. 23 is a top view of the table top section of FIGS. 19-22.

FIG. 23 shows a top view of the section 220 of FIGS. 19-22, illustrating the triangular or generally triangular shape of section 220. It may be noted from this view that the handles/paddles, connected to the underside of the section 220, are not visible in this view, as they are positioned at or slightly inward from the edges of the right and left hand-hold notches forming spaces 232 that are provided for the fingers of the user. The handles/paddles of section 220, even though they may be slightly inward from the hand-hold notch edges so as to not be visible in FIG. 23, may be described as being under, near, and/or at the hand-hold notches due to being on the underside of the section 220 and at or very near the notches.

Although this invention has been described above with reference to particular means, materials and embodiments, it is to be understood that the invention is not limited to these disclosed particulars, but extends instead to all equivalents within the scope of the following claims.

I claim:

1. A table comprising a table leg for resting on a floor or ground, and multiple table top-sections each having a right edge and a left edge, an inner edge near the table leg, and an outer edge at which a user sits or stands;

each top-section comprising a vertical adjustment mechanism and a horizontal adjustment mechanism, wherein the vertical and horizontal adjustment mechanisms are separate and independent from each other so that each table top-section is raisable and lowerable to multiple levels above the floor or ground, and each top-section is retractable horizontally inward and extendable horizontally outward when the top-section is at any of said levels;

the vertical and horizontal adjustment mechanisms of each top-section comprising two actuators including a right-edge actuator under and near the right edge and a left-edge actuator under and near the left edge, a latching gas spring in the table leg and operatively connected to the top-section wherein the gas spring in an unlatched condition allows vertical movement of the top-section, a track system operatively connecting the top-section to the table leg wherein the track system in an unlatched condition allows horizontal movement of the top-section, and control cables extending from the actuators to the gas spring and the track system, wherein the actuators are adapted to unlatch the top-section for vertical and horizontal adjustment by the user grasping the right side edge and the right-edge actuator in one hand, and by grasping the left side edge and the left-edge actuator in another hand, wherein said grasping operates said actuators to move the control cables to unlatch the gas spring and the track system, for movement in vertical and horizontal directions, respectively.

2. The table of claim 1, wherein each top-section has a bottom surface, and the right-edge actuator is positioned under a right hand-hold notch in the right edge, the right hand-hold notch being for receiving the user's fingers curling through the right hand-hold notch, around the right edge and under the right-edge actuator, so that said grasping of the right edge and the right-edge actuator moves the right-edge actuator toward the bottom surface of the top-section.

3. The table of claim 2, wherein the right-edge actuator is received in a recess in the bottom surface.

4. The table of claim 2, wherein the left-edge actuator is positioned under a left hand-hold notch in the left edge, the left hand-hold notch being for receiving the user's fingers curling through the left hand-hold notch, around the left edge and to the left-edge actuator, so that said grasping of the left edge and the left-edge actuator moves the left-edge actuator toward the bottom surface of the top-section.

5. The table of claim 4, wherein the left-edge actuator is received in a recess in the bottom surface.

6. The table of claim 1, wherein each of the top-sections is triangular in shape and the outer edge is wider from the right edge to left edge than is the inner edge.

7. The table of claim 1, wherein each top-section has a bottom surface and each of the actuators is a paddle that is biased away from the bottom surface to a first position that moves the cables to latch the gas spring and the track system so that the top-section does not move relative to the table leg.

8. The table of claim 7, wherein, upon said grasping, each paddle pivots toward the bottom surface to a second position that moves the cables to unlatch the gas spring and the track system so that the top-section is free to move relative to the table leg.

9. The table of claim 8, wherein the unlatched condition of the gas spring allows lengthening and shortening of the gas spring to raise and lower the top-section, respectively.

10. The table of claim 8, wherein the track system comprises an apertured track connected to the table leg and a pin-unit connected to the top-section, wherein the unlatched condition of the track system comprises a pin of the pin-unit being withdrawn from the apertured track to allow the top-section to be pulled horizontally outward from the table leg and to be pushed horizontally inward toward the table leg.

11. The table of claim 1, comprising four of said top-sections.

12. The table of claim 1, comprising four of said top-sections and comprising one of said gas springs for each of said four top-sections.

13. The table of claim 1, wherein the table-top sections each have an upper surface that remains horizontal when the table top section is raised and lowered and when retracted and extended, and no table-top section pivots or swings up or down from horizontal.

14. The table of claim 1, wherein the table-top sections each have an upper surface that remains horizontal when the table top section is raised and lowered and when retracted and extended, and no table-top section pivots or swings left to right, or right to left.

15. The table of claim 1, wherein each table-top section is adapted to be vertically adjustable and horizontally adjustable at the same time.

16. The table of claim 15, wherein both of said right-edge actuator and said left-edge actuator are grasped at the same time and force is applied upward or downward, and inward or outward, for vertical and horizontal adjustment at the same time.

17. A table comprising:

a table stand for resting on a floor or ground and having multiple vertically-moveable portions;

multiple table top-sections each being connected to a respective one of said vertically-moveable portions, and each having a right edge and a left edge, an inner edge near the table leg, and an outer edge at which a user sits or stands;

wherein each table top-section further comprises a vertical adjustment mechanism and a horizontal adjustment mechanism, wherein the vertical and horizontal adjustment mechanisms are separate and independent from each other so that each table top-section is raisable and lowerable to multiple levels above the floor or ground, and each top-section is retractable horizontally inward and extendable horizontally outward when the top-section is at any of said levels;

the vertical adjustment mechanism of each top-section comprising a first actuator under and near a first one of the right edge and the left edge of the top-section, a latching gas spring provided in the table leg and operatively connected to the vertically-moveable portion, wherein the gas spring in an unlatched condition allows vertical movement of the vertically-movable portion and the top-section, and a first control cable, extending from and controllable by said first actuator, that operatively connects to the latching gas spring to unlatch and latch the gas spring for said vertical movement;

the horizontal adjustment mechanism of each top-section comprising a second actuator under and near a second one of the right edge and the left edge of the top-section, and a latch system operatively connecting the top-section to said vertically-moveable portion, wherein the latch system in an unlatched condition allows horizontal movement of the top-section relative to said vertically-movable portion, and a second control cable, extending from and controllable by said second actuator, that operatively connects to the latch system for unlatching the top-section from said vertically-movable portion for said horizontal movement.

18. The table of claim 17, wherein the first actuator and the second actuator are adapted to unlatch the gas spring, and the latch system, respectively, by the user grasping the right edge and the right-edge actuator in one hand, and by grasping the left edge and the left-edge actuator in another hand, wherein said grasping operates said actuators to move the control cables to unlatch the gas spring, and unlatch the latch system, for movement in vertical and horizontal directions, respectively, at the same time.

19. The table of claim 17, wherein each top-section has a bottom surface, and the right-edge actuator is positioned under a right hand-hold notch in the right edge, the right hand-hold notch being for receiving the user's fingers curling through the right hand-hold notch, around the right edge and under the right-edge actuator, so that said grasping of the right edge and the right-edge actuator moves the right-edge actuator toward the bottom surface of the top-section.

20. The table of claim 19, wherein the left-edge actuator is positioned under a left hand-hold notch in the left edge, the left hand-hold notch being for receiving the user's fingers curling through the left hand-hold notch, around the left edge and to the left-edge actuator, so that said grasping of the left edge and the left-edge actuator moves the left-edge actuator toward the bottom surface of the top-section.

21. The table of claim 17, comprising four of said top-sections and comprising one of said gas springs for each of said four top-sections.

* * * * *